(12) United States Patent
Holzer et al.

(10) Patent No.: US 10,275,935 B2
(45) Date of Patent: Apr. 30, 2019

(54) SYSTEM AND METHOD FOR INFINITE SYNTHETIC IMAGE GENERATION FROM MULTI-DIRECTIONAL STRUCTURED IMAGE ARRAY

(71) Applicant: Fyusion, Inc., San Francisco, CA (US)

(72) Inventors: Stefan Johannes Josef Holzer, San Mateo, CA (US); Radu Bogdan Rusu, San Francisco, CA (US); Yuheng Ren, San Bruno, CA (US)

(73) Assignee: Fyusion, Inc., San Francisco, CA (US)

( * ) Notice: Subject to any disclaimer, the term of this patent is extended or adjusted under 35 U.S.C. 154(b) by 109 days.

(21) Appl. No.: 15/425,988

(22) Filed: Feb. 6, 2017

(65) Prior Publication Data

US 2017/0148199 A1 May 25, 2017

Related U.S. Application Data

(63) Continuation-in-part of application No. 14/530,669, filed on Oct. 31, 2014, and a continuation-in-part of
(Continued)

(51) Int. Cl.
*G06T 15/20* (2011.01)
*G06F 17/30* (2006.01)
(Continued)

(52) U.S. Cl.
CPC ........ *G06T 15/205* (2013.01); *G06F 3/04845* (2013.01); *G06F 17/30256* (2013.01);
(Continued)

(58) Field of Classification Search
None
See application file for complete search history.

(56) References Cited

U.S. PATENT DOCUMENTS

| 5,926,190 A | 7/1999 | Turkowski et al. |
| 6,252,974 B1 | 6/2001 | Martens et al. |

(Continued)

OTHER PUBLICATIONS

Stephen Pollard, Sean Hayes, Maurizio Pilu, Adele Lorusso, "Automatically Synthesising Virtual Viewpoints by Trinocular Image Interpolation—Detailed Report", Dec. 1997, HP, Technical Report, HP Laboratories Bristol HPL-97-166.*

(Continued)

*Primary Examiner* — Robert Bader
(74) *Attorney, Agent, or Firm* — Kwan & Olynick LLP

(57) ABSTRACT

This present disclosure relates to systems and processes for interpolating images of an object from a multi-directional structured image array. In particular embodiments, a plurality of images corresponding to a light field is obtained using a camera. Each image contains at least a portion of overlapping subject matter with another image. First, second, and third images are determined, which are the closest three images in the plurality of images to a desired image location in the light field. A first set of candidate transformations is identified between the first and second images, and a second set of candidate transformations is identified between the first and third images. For each pixel location in the desired image location, first and second best pixel values are calculated using the first and second set of candidate transformations, respectively, and the first and second best pixel values are blended to form an interpolated pixel.

20 Claims, 20 Drawing Sheets

Related U.S. Application Data application No. 14/800,638, filed on Jul. 15, 2015, now Pat. No. 9,940,541, and a continuation-in-part of application No. 14/860,983, filed on Sep. 22, 2015.

(51) Int. Cl.
| | | |
|---|---|---|
| *G06F 3/0484* | (2013.01) | |
| *G06T 3/40* | (2006.01) | |
| *H04N 5/232* | (2006.01) | |
| *H04N 5/265* | (2006.01) | |
| *G06T 7/33* | (2017.01) | |
| *H04N 13/279* | (2018.01) | |
| *H04N 13/282* | (2018.01) | |

(52) U.S. Cl.
CPC .. *G06F 17/30277* (2013.01); *G06F 17/30784* (2013.01); *G06F 17/30837* (2013.01); *G06T 3/4038* (2013.01); *G06T 7/337* (2017.01); *H04N 5/23238* (2013.01); *H04N 5/265* (2013.01); *H04N 13/279* (2018.05); *H04N 13/282* (2018.05); *G06T 2207/10016* (2013.01); *G06T 2207/10052* (2013.01); *G06T 2207/20221* (2013.01)

(56) References Cited

U.S. PATENT DOCUMENTS

| | | |
|---|---|---|
| 8,078,004 B2 | 12/2011 | Kang et al. |
| 2002/0094125 A1 | 7/2002 | Guo |
| 2006/0188147 A1 | 8/2006 | Rai et al. |
| 2008/0106593 A1 | 5/2008 | Arfvidsson et al. |
| 2008/0152258 A1 | 6/2008 | Tulkki |
| 2008/0201734 A1 | 8/2008 | Lyon et al. |
| 2008/0225132 A1 | 9/2008 | Inaguma |
| 2008/0246759 A1 | 10/2008 | Summers |
| 2009/0263045 A1 | 10/2009 | Szeliski et al. |
| 2009/0303343 A1 | 12/2009 | Drimbarean et al. |
| 2010/0033553 A1 | 2/2010 | Levy |
| 2010/0171691 A1 | 7/2010 | Cook et al. |
| 2011/0254835 A1 | 10/2011 | Segal |
| 2011/0261050 A1 | 10/2011 | Smolic et al. |
| 2012/0019557 A1 | 1/2012 | Aronsson et al. |
| 2012/0147224 A1 | 6/2012 | Takayama |
| 2013/0155180 A1 | 6/2013 | Wantland et al. |
| 2013/0162634 A1 | 6/2013 | Baik |
| 2013/0250045 A1 | 9/2013 | Ki et al. |
| 2014/0087877 A1 | 3/2014 | Krishnan |
| 2014/0253436 A1 | 9/2014 | Petersen |
| 2014/0307045 A1 | 10/2014 | Richardt et al. |
| 2015/0130799 A1 | 5/2015 | Holzer et al. |
| 2015/0130800 A1 | 5/2015 | Holzer et al. |
| 2015/0130894 A1 | 5/2015 | Holzer et al. |
| 2015/0134651 A1 | 5/2015 | Holzer et al. |
| 2015/0138190 A1 | 5/2015 | Holzer et al. |
| 2015/0339846 A1 | 11/2015 | Holzer et al. |
| 2017/0018054 A1 | 1/2017 | Holzer et al. |
| 2017/0018055 A1 | 1/2017 | Holzer et al. |
| 2017/0018056 A1 | 1/2017 | Holzer et al. |
| 2017/0084001 A1 | 3/2017 | Holzer et al. |

OTHER PUBLICATIONS

Chris Buehler, Michael Bosse, Leonard McMillan, Steven Gortler, Michael Cohen, "Unstructured Lumigraph Rendering", Aug. 17, 2001, ACM, ACM SIGGRAPH 2001, pp. 425-432.*

Abe Davis, Marc Levoy, Fredo Durand, "Unstructured Light Fields", May 2012, Blackwell Publishing, Computer Graphics Forum, vol. 31, Issue 2, part 1, pp. 305-314.*

Jiangjian Xiao, Mubarak Shah, "Tri-view nnorphing", Dec. 2004, Elsevier, Computer Vision and Image Understanding, vol. 96, Issue 3, pp. 345-366.*

Andrew Fitzgibbon, Andrew Zisserman, "Automatic 3D Model Acquisition and Generation of New Images from Video Sequences", Sep. 11, 1998, IEEE, 9th European Signal Processing Conference (EUSIPCO 1998).*

P.H.S. Torr, A. Zisserman, "Robust Parameterization and Computation of the Trifocal Tensor", Aug. 1997, Elsevier, Image and Vision Computing, vol. 15, Issue 8, pp. 591-605.*

* cited by examiner

SYSTEM AND METHOD FOR INFINITE SYNTHETIC IMAGE GENERATION FROM MULTI-DIRECTIONAL STRUCTURED IMAGE ARRAY

CROSS-REFERENCE TO RELATED APPLICATIONS

This application is a continuation-in-part of U.S. patent application Ser. No. 14/530,669 by Holzer et al., filed on Oct. 31, 2014, titled ANALYSIS AND MANIPULATION OF IMAGES AND VIDEO FOR GENERATION OF SURROUND VIEWS; and a continuation-in-part of U.S. patent application Ser. No. 14/800,638 by Holzer et al., filed on Jul. 15, 2015, titled ARTIFICIALLY RENDERING IMAGES USING INTERPOLATION OF TRACKED CONTROL POINTS; and a continuation-in-part of U.S. patent application Ser. No. 14/860,983 by Holzer et al., filed on Sep. 22, 2015, titled ARTIFICIALLY RENDERING IMAGES USING VIEWPOINT INTERPOLATION AND EXTRAPOLATION. The above referenced applications are incorporated by reference herein in their entirety and for all purposes.

TECHNICAL FIELD

The present disclosure relates generally to the capture and presentation of image sequences, and more specifically to artificially rendering images between captured image frames.

BACKGROUND

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Producing combined images, such as a panorama, or a three-dimensional (3D) image or model requires combining data from multiple images and can require interpolation or extrapolation of data. Most previously existing methods of interpolation or extrapolation require a significant amount of data in addition to the available image data. For those approaches, the additional data needs to describe the scene structure in a dense way, such as provided by a dense depth map (where for every pixel a depth value is stored) or an optical flow map (which stores for every pixel the motion vector between the available images). This limits the efficiency of these methods in processing speed as well as transfer rates when sending it over a network. Accordingly, improved mechanisms for interpolation and extrapolation are desirable.

SUMMARY

Provided are various mechanisms and processes relating to infinite smoothing of image sequences. In one aspect, which may include at least a portion of the subject matter of any of the preceding and/or following examples and aspects, a method for interpolating images of an object from a multi-directional structured image array is provided. The method comprises obtaining a plurality of images corresponding to a light field using a camera. Each image in the plurality of images contains at least a portion of overlapping subject matter with another image. The overlapping subject matter includes an object.

The method further comprises determining first, second, and third images in the plurality of images. The first, second, and third images are the closest three images in the plurality of images to a desired image location in the light field.

The method further comprises identifying a first set of candidate transformations between the first image and the second image. The method further comprises identifying a second set of candidate transformations between the first image and the third image. Identifying the first set of candidate transformations between the first image and the second image may include computing at least one candidate transformation from a plurality of tracked keypoints using similarity 2D parameters.

The method further comprises calculating a first best pixel value using the first set of candidate transformations for each pixel location in the desired image location in the light field. Calculating the first best pixel value may include computing each candidate transformation in the first set of candidate transformations to generate a first set of transformation pairs. Each transformation pair in the first set of transformation pairs may include a transformation from the first image and the second image.

The method further comprises calculating a second best pixel value using the second set of candidate transformations for each pixel location in the desired image location in the light field. Calculating the second best pixel value may include computing each candidate transformation in the second set of candidate transformations to generate a second set of transformation pairs. Each transformation pair in the second set of transformation pairs may include a transformation from the first image and the third image.

Calculating the first best pixel value and the second best pixel value may include determining a best pair of transformations. The best pair of transformations may include a first best transformation from the first set of candidate transformations and a second best transformation from the second set of candidate transformations. Calculating the first best pixel value and the second best pixel value includes determining a best pair of transformations, which may include a first best transformation from the first set of candidate transformations and a second best transformation from the second set of candidate transformations. Calculating the first best pixel value may include applying the first best transformation to a pixel in either the first image or the second image, and calculating the second best pixel value may include applying the second best transformation to a pixel in either the first image or third image.

The method further comprises blending the first and second best pixel values to form an interpolated pixel. Forming the interpolated pixel includes blending a third best pixel value.

Other implementations of this disclosure include corresponding devices, systems, and computer programs, configured to perform the actions of the described method. For instance, a non-transitory computer readable medium is provided comprising one or more programs configured for execution by a computer system. In some embodiments, the one or more programs include instructions for performing the actions of described methods and systems. These other implementations may each optionally include one or more of the following features.

In another aspect, which may include at least a portion of the subject matter of any of the preceding and/or following examples and aspects, a system for interpolating images of an object from a multi-directional structured image array is provided comprises a camera for obtaining a plurality of images corresponding to a light field. Each image in the sequence of images contains at least a portion of overlapping subject matter with another image. The overlapping subject matter includes an object. The system further comprises a processor and memory storing one or more programs configured for execution by the processor. The one or more programs comprise instructions for performing the actions of described methods and systems.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION

Figure 1:
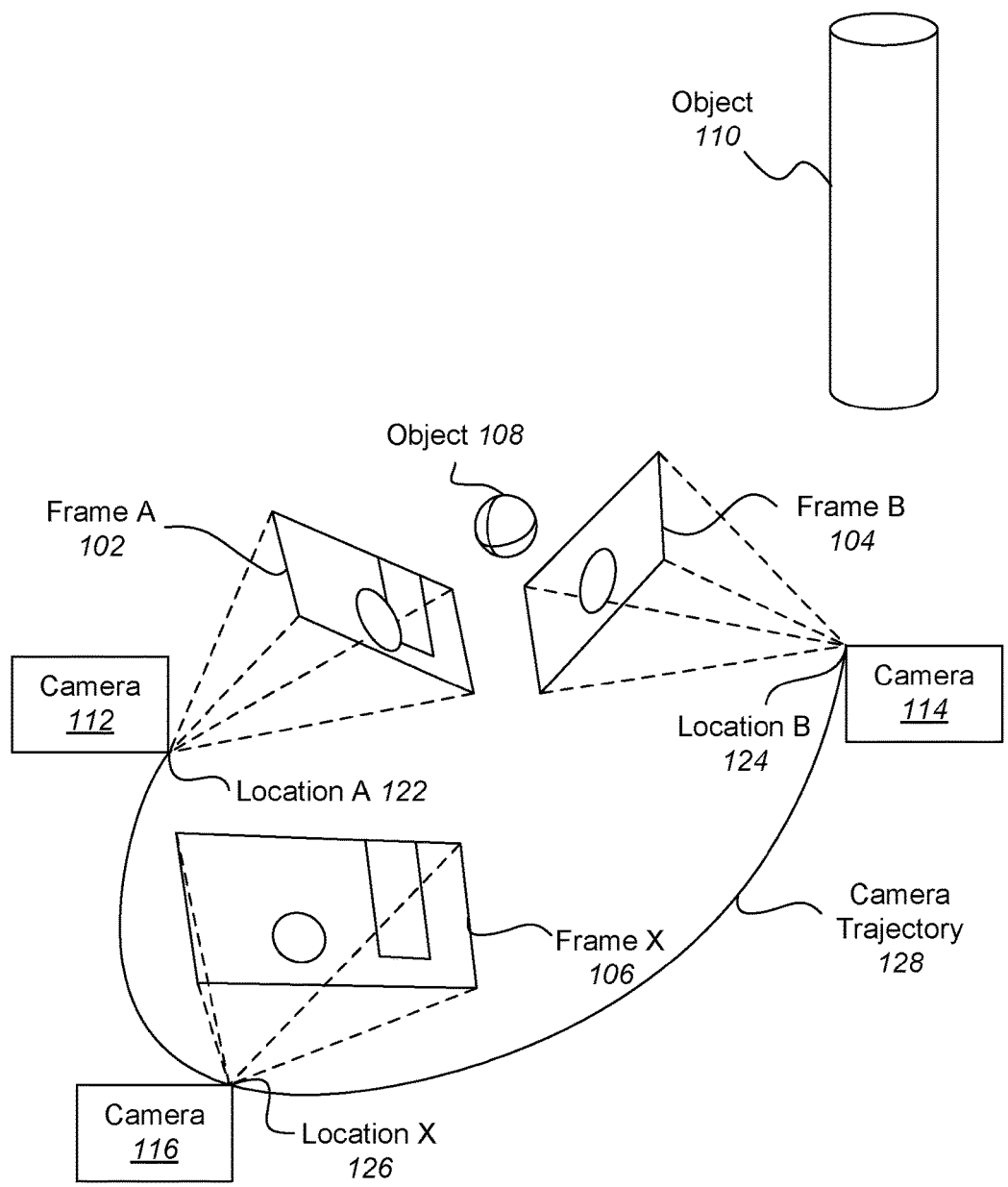
FIG. 1 illustrates an example of a configuration where an artificially rendered image is generated for a chosen viewpoint on a trajectory between two frames.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

Various systems and methods for analyzing the spatial relationship between multiple images and video together with location information data, for the purpose of creating a single representation, a surround view, which eliminates redundancy in the data, and presents a user with an interactive and immersive active viewing experience, is described in U.S. patent application Ser. No. 14/530,669 by Holzer et al., filed on Oct. 31, 2014, titled ANALYSIS AND MANIPULATION OF IMAGES AND VIDEO FOR GENERATION OF SURROUND VIEWS, which is incorporated by reference herein in its entirety and for all purposes. According to various embodiments described therein, a surround view provides a user with the ability to control the viewpoint of the visual information displayed on a screen.

Overview

According to various embodiments, a surround view is a multi-view interactive digital media representation. The data used to generate a surround view can come from a variety of sources. In particular, data such as, but not limited to, two-dimensional (2D) images can be used to generate a surround view. These 2D images can include color image data streams such as multiple image sequences, video data, etc., or multiple images in any of various formats for images, depending on the application. Another source of data that can be used to generate a surround view includes location information. This location information can be obtained from sources such as accelerometers, gyroscopes, magnetometers, GPS, WiFi, IMU-like systems (Inertial Measurement Unit systems), and the like. Yet another source of data that can be used to generate a surround view can include depth images. These depth images can include depth, 3D, or disparity image data streams, and the like, and can be captured by devices such as, but not limited to, stereo cameras, time-of-flight cameras, three-dimensional cameras, and the like.

In some embodiments, the data can then be fused together. For example, a surround view can be generated by a combination of data that includes both 2D images and location information, without any depth images provided. In other embodiments, depth images and location information can be used together. In various embodiments, depth images may include stereoscopic pairs of images simultaneously presented to the user to provide depth perception of an object of interest and/or other portions of the image. Such stereoscopic pairs of image frames may be created by systems and methods described in U.S. patent application Ser. No. 15/408,211 titled GENERATING STEREOSCOPIC PAIRS OF IMAGES FROM A SINGLE LENS CAMERA by Holzer et al., filed on Jan. 17, 2017, which application is incorporated by reference herein in its entirety and for all purposes. Various combinations of image data can be used with location information, depending on the application and available data.

In present example embodiments, the data that has been fused together may then used for content modeling and context modeling. According to various examples, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. In various embodiments, the models provided by content modeling and context modeling can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target can be chosen. It should be noted, however, that a surround view can be generated without a user specified target in some applications.

In present example embodiments, one or more enhancement algorithms can be applied. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to various example embodiments, view interpolation can be used to improve the viewing experience. In particular, to avoid sudden "jumps" between stabilized frames, synthetic, intermediate views can be rendered on the fly. According to various embodiments, only a limited amount of image frames are stored for each surround view for storage efficiency. In some examples, the selection of these frames is based on the motion of the camera rather than on time. For instance, a new frame may be sampled only if the camera moved sufficiently with respect to the previously sampled frame. Consequently, in order to provide a smooth viewing experience for a user interacting with a surround view, artificially rendered frames must be generated. These artificially rendered frames serve to close the gap between two sampled frames that would otherwise appear to have a "jump" between them.

Such artificially rendered frames may be created by systems and methods described in U.S. patent application Ser. No. 15/425,983 by Holzer et al., filed on Feb. 2, 2017, titled SYSTEM AND METHOD FOR INFINITE SMOOTHING OF IMAGE SEQUENCES, which application is incorporated by reference herein in its entirety and for all purposes. Accordingly, by generating these artificially rendered frames, smooth navigation within the surround view becomes possible. This can be informed by content-weighted keypoint tracking and IMU information, as well as by denser pixel-to-pixel matches. If depth information is available, fewer artifacts resulting from mismatched pixels may occur, thereby simplifying the process. As described above, view interpolation can be applied during capture and/or acquisition of a surround view in some embodiments. In other embodiments, view interpolation can be applied during surround view generation.

In some embodiments, artificial images may be linearly interpolated based on images captured along a linear camera translation, such as an concave and/or convex arc. However, in some embodiments, images may be captured along a camera translation comprising multiple directions, such as a light field comprising multiple image captures from multiple camera locations. The image frames may be organized as a multi-direction structured image array, which may allow smooth navigation through the captured space. Given a structured image on 2D graph where each node is a keyframe, every connection between keyframe is a relative transformation. By triangulating the centers corresponding to each camera location, artificial images may be rendered based on information from the three nearest image frames. Artificial frames may be rendered by determining the nearest three neighboring keyframes on the graph based on a given spatial location, which may correspond to a selected camera position. The relative transformation from the selected position to the three neighboring keyframes is then determined by trilinear interpolation. For each pixel in the selected synthetic location, a corresponding pixel in the three keyframes is determined given a transformation and the differences between the three pixels in the keyframes is evaluated. The transformation with the minimum difference is used as the transformation of that pixel. Each pixel in the synthetic image is generated by blending its corresponding pixel in the key frames given the best transformation.

In the present embodiment, a surround view is generated after any enhancement algorithms are applied. The surround view can provide a multi-view interactive digital media representation. In various examples, the surround view can include a three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used to enhance various fields such as e-commerce, visual search, 3D printing, file sharing, user interaction, and entertainment.

In some embodiments, the surround view model is not an actual three-dimensional model that is rendered, but a three-dimensional view experienced as a three-dimensional model by the user. For example, the surround view provides a three-dimensional view of the content without rendering and/or storing an actual three-dimensional model. In other words, there is no polygon generation or texture mapping over a three-dimensional mesh and/or polygon model. However, the user still perceives the content and/or context as an actual three-dimensional model. The three-dimensional effect provided by the surround view is generated simply through stitching of actual two-dimensional images and/or portions thereof. As used herein, the term "three-dimensional model" is used interchangeably with this type of three-dimensional view.

Various embodiments described below include methods of viewpoint interpolation and extrapolation that can be used to generate any number of artificially rendered frames. In some embodiments, parameters for interpolation may be calculated and stored to be used for on-the-fly interpolation during runtime. An image may be artificially rendered for any number of camera locations based on user selection during runtime. This allows for further storage efficiency because an artificial image may be generated during runtime, instead of storing all images corresponding to all possible camera locations. In various examples, interpolation between frames is performed along a path between the frames. In some instances, this path can follow a non-linear trajectory. In addition, various described extrapolation methods allow the artificially rendered frame to represent a view from a location that is not on the trajectory of the recording camera or in between two sampled frames. By providing interpolation and extrapolation methods for paths between or beyond the originally provided frames, various artificially rendered views can be provided for a surround view.

Example Embodiments

With reference to FIG. 1, shown is one example of multiple camera frames that can be fused together into a three-dimensional (3D) model to create an immersive experience. According to various embodiments, multiple images can be captured from various viewpoints and fused together to provide a surround view. In the present example embodiment, three cameras 112, 114, and 116 are positioned at location A 122, location B 124, and location X 126, respectively, in proximity to an object of interest 108. Scenery can surround the object of interest 108 such as object 110. Frame A 102, frame B 104, and frame X 106 from their respective cameras 112, 114, and 116 include overlapping subject matter. Specifically, each frame 102, 104, and 106 includes the object of interest 108 and varying degrees of visibility of the scenery surrounding the object 110. For instance, frame A 102 includes a view of the object of interest 108 in front of the cylinder that is part of the scenery surrounding the object 110. View 106 shows the object of interest 108 to one side of the cylinder, and view 104 shows the object of interest without any view of the cylinder.

In the present example embodiment, the various frames, frame A 102, frame B 104, and frame X 116, along with their associated locations, location A 122, location B 124, and location X 126, respectively, provide a rich source of information about object of interest 108 and the surrounding context that can be used to produce a surround view. For instance, when analyzed together, the various frames 102, 104, and 126 provide information about different sides of the object of interest and the relationship between the object of interest and the scenery. According to various embodiments, this information can be used to parse out the object of interest 108 into content and the scenery as the context. Furthermore, as also described above, various enhancement algorithms can be applied to images produced by these viewpoints to create an immersive, interactive experience when viewing a surround view.

In some embodiments, Frame X 106 may be an artificially rendered image that is generated for a viewpoint at Location X 126 on a trajectory between Location A 122 and Location B 124. In such example, a single transform for viewpoint interpolation is used along the trajectory between two frames, Frame A 102 and Frame B 104. As previously described, Frame A 102 represents an image captured of objects 108 and 110 by a camera 112 located at Location A 122. Frame B 104 represents an image captured of object 108 by a camera 114 located at Location B 124. In the present example, the transformation (T_AB) is estimated between the two frames, where T_AB maps a pixel from frame A to frame B. This transformation is performed using methods such as homography, affine, similarity, translation, rotation, or scale.

In the example above, an artificially rendered image at Location X 126, which can also be denoted as a viewpoint position at x \in [0, 1] on the trajectory between frame A and B, where frame A is located at 0 and frame B at 1, is then generated by interpolating the transformation, gathering image information from Frames A and B, and combining the image information. In the present example, the transformation is interpolated (T_AX and T_XB). One way to interpolate this transformation is to parameterize the transformation T_AB and linearly interpolate those parameters. However, this interpolation is not limited to linear interpolations and other methods can be used within the scope of this disclosure. Next, image information is gathered from both Frames A and B by transferring image information from Frame A 102 to Frame X 106 based on T_AX and by transferring image information from Frame B 104 to Frame X 106 based on T_XB. Finally, the image information gathered from both Frames A and B is combined to generate an artificially rendered image at Location X 126. Various methods and systems for interpolation to render artificial frames are further described herein.

Figure 2:
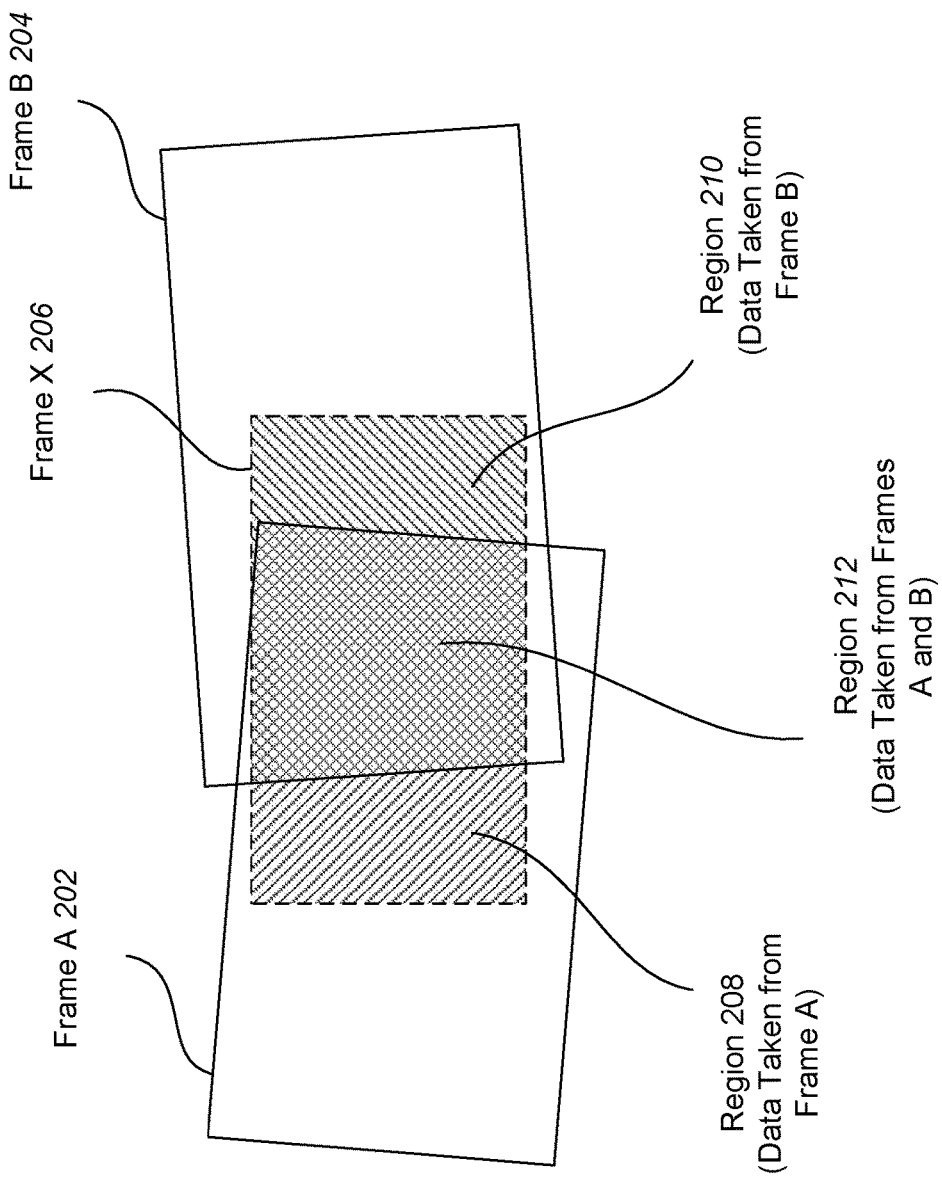
FIG. 2 illustrates an example of combining image information gathered from two frames to artificially render an image for another frame using weighted image information.

In the present example, combining the image information gathered from both Frames A and B can be done in various ways. With reference to FIG. 2, shown is one example of a way to combine image information gathered from both Frames A and B to artificially render an image in Frame X using weighted image information. As shown, image information is taken from Frame A 202 and Frame B 204 to generate an image in Frame X 206. Image information in Region 208 of Frame X 206 is taken from Frame A. Image information in Region 210 of Frame X 206 is taken from Frame B. Image information in Region 212 of Frame X 206 includes information from both Frame A 202 and Frame B 204. In order to account for the overlap in information, the image information is weighted. Specifically, the information is combined using the image information from Frame A 202 using 1-x and the image information from Frame B 204 using x.

Figure 3:
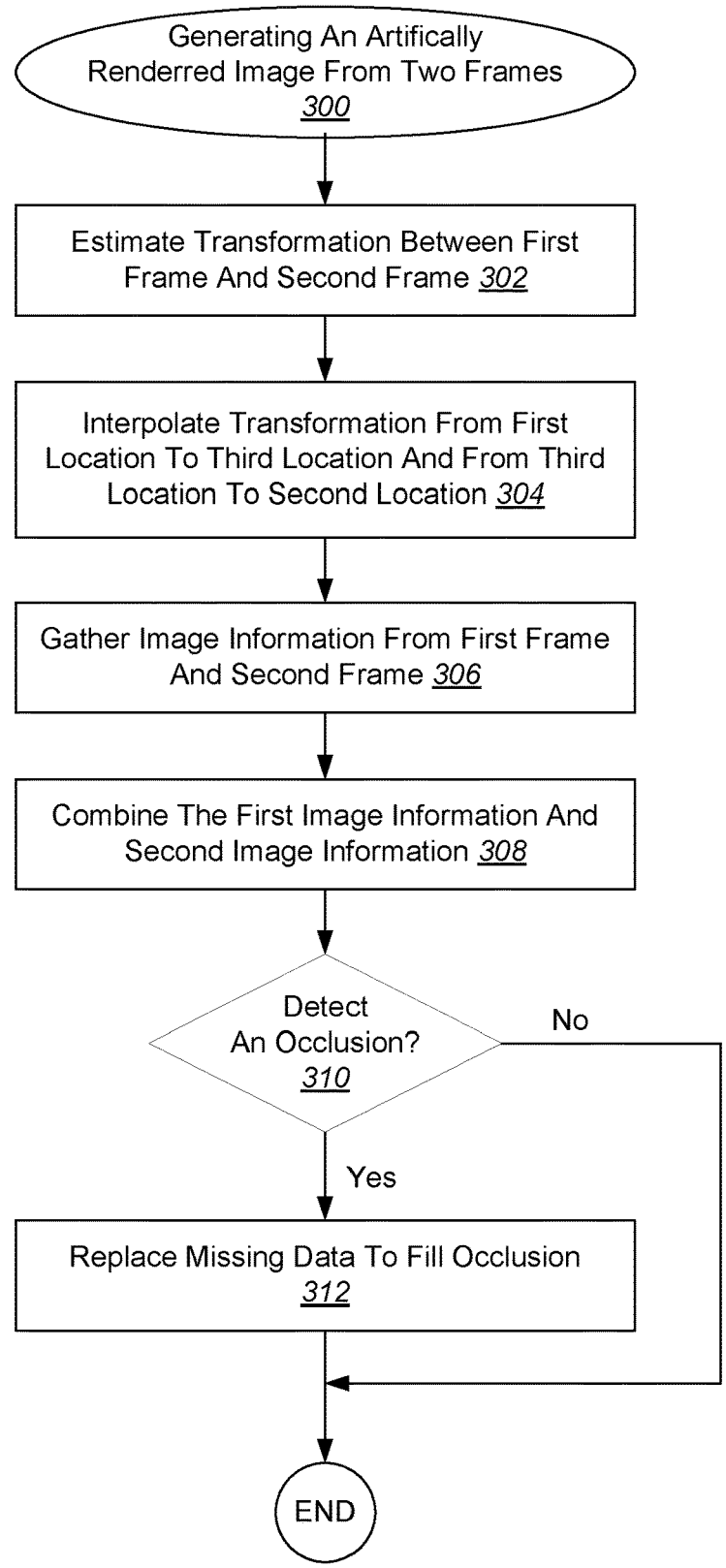
FIG. 3 illustrates an example of a process for generating an artificially rendered image from two frames.

With reference to FIG. 3, shown is an example of a process for generating an artificially rendered image from two frames 300. In this example, a transformation is estimated between a first frame and a second frame at 302. The transformation is estimated using methods such as homography, affine, similarity, translation, rotation, and/or scale. As described above with regard to FIG. 1, the first frame includes a first image captured from a first location (Location A 122) and the second frame includes a second image captured from a second location (Location B 124). In some examples, the first image and second image are associated with the same layer. Next, an artificially rendered image is rendered corresponding to a third location. This third location is positioned on a trajectory between the first location and the second location, as shown as Location X 126 in FIG. 1.

The artificially rendered image is generated in a number of steps. First, a transformation is interpolated from the first location to the third location and from the third location to the second location at 304. In some instances, interpolating the transformation includes parameterizing the transformation from the first location to the third location and from the third location to the second location. Furthermore, in some examples, the parameterized transformation is then linearly interpolated. Parameterizing a transformation is further described below with reference to FIGS. 9 and 10A-10C.

Next, image information is gathered from the first frame and the second frame at 306 by transferring first image information from the first frame to the third frame based on the interpolated transformation and second image information from the second frame to the third frame based on the interpolated transformation. Finally, the first image information and the second image information is combined to yield the artificially rendered image. In some examples, combining the first image information and the second image information includes weighting the first image information from the first frame and the second image information from the second frame.

According to various embodiments, the process can end with combining the first image information and second image information at 308. However, according to the present example, the process shown continues with determining whether an occlusion is present in the artificially rendered image at 310. Such an occlusion is created by a change in layer placement between the first frame and second frame. Specifically, the first image and second image may include foregrounds and backgrounds that include one or more layers, each layer corresponding to a region of image pixels that share a similar motion, as described in more detail below with regard to FIG. 4. These layers can move relative to each other. In some cases, the layers may move in a manner causing an occlusion in a combined image. If an occlusion is detected, then the missing data is replaced to fill the first occlusion at 312. In some instances, the missing data is obtained by interpolation or extrapolation. In other instances, the missing data is obtained from the first frame or the second frame. In yet other instances, the missing data is obtained from another frame (separate from the first and second frame) that includes image information corresponding to the missing data. In another example, the missing data is obtained by extrapolating from surrounding image data. This surrounding image data includes information from frames located near the first location and second location.

Figure 4:
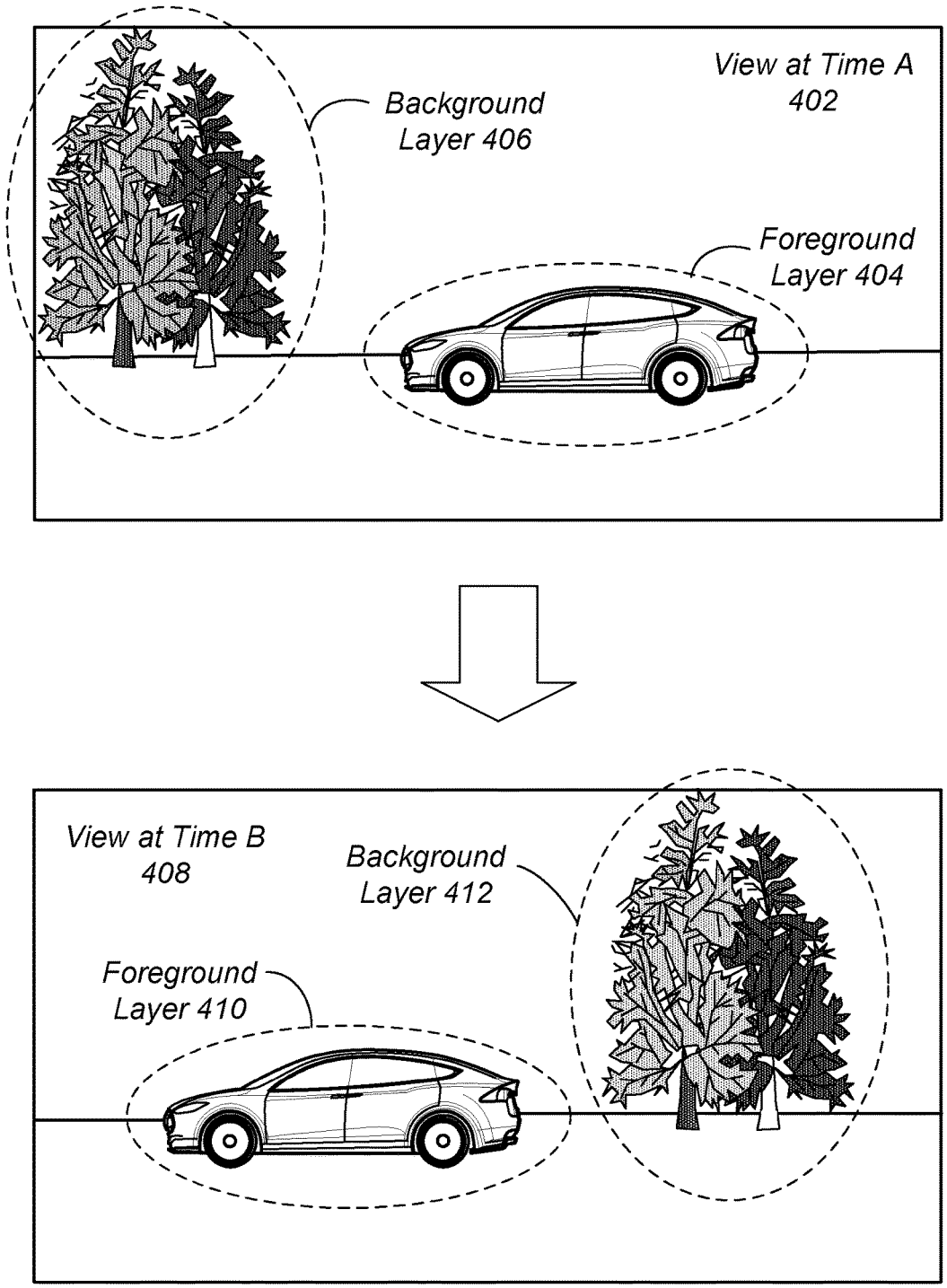
FIG. 4 illustrates an example of combining image information gathered from two frames to artificially render an image in another frame using multiple layers extracted from surround views.

With reference to FIG. 4, shown is an example of combining image information gathered from both Frames A and B to artificially render an image in Frame X by using multiple layers of an image. The present example uses the method described above with regard to FIG. 3, where the first frame and second frame are made up of two or more layers. In particular, the first frame, which includes a view at Time A 402, includes a background layer 406 and foreground layer 404. The second frame, which includes a view at Time B 408, includes a background layer 412 and foreground layer 410. In some examples, the foreground and/or background can include one or more layer. In some embodiments, a layer is a region of image pixels that share a similar motion, based on factors such as depth and or speed of the corresponding real world object.

In the present example, viewpoint-interpolation can be used to generate an artificially rendered image as described above with regard to FIG. 3. In addition, because different motions of the layers can create occlusions and/or regions with missing data, the process can also include methods for filling the regions corresponding to any detected occlusions. Whether data is occluded or missing is based on the ordering of layers. Although the layers are expected to stay in the same order, they can switch order if the objects change their depth location within the scene. For instance, occlusions are created if a first layer moves in front of a second layer, where the first layer is closer to the camera than second layer. In the case that the first layer is not transparent (or non-see-through), image information from the first layer is taken wherever the first and second layer overlap. In the case that the first layer is partially see-through, image information is taken from both layers according to the opacity of the first layer. This process can also be extended to more than two layers.

As described above with regard to FIG. 3, missing information can be obtained in various ways, including interpolation or extrapolation. For instance, missing data can be taken from only one of the frames, depending on which frame includes a view of the missing data. In another example, the missing data can be taken from other frames where this region is visible. For instance, in a surround view that includes various frames and viewpoints, other frames can be used to fill in this missing data. In another example, the missing data can be extrapolated from surrounding image data, to create artificial image data that estimates what the missing data would look like. In yet another example, viewpoint-extrapolation using multiple layers can be applied outside of the trajectory between the two frames, by moving the different layers in perpendicular motion to the trajectory motion, as shown in more detail with regard to FIG. 6. According to various examples, the transform between the two frames can be an image transformation or a 3D transformation. An image transformation can use methods such as homography, affine, similarity, translation, rotation, scale. For a 3D transformation, layers are moved with respect to their depth and the 3D transformation, according to various embodiments.

Figure 5A:
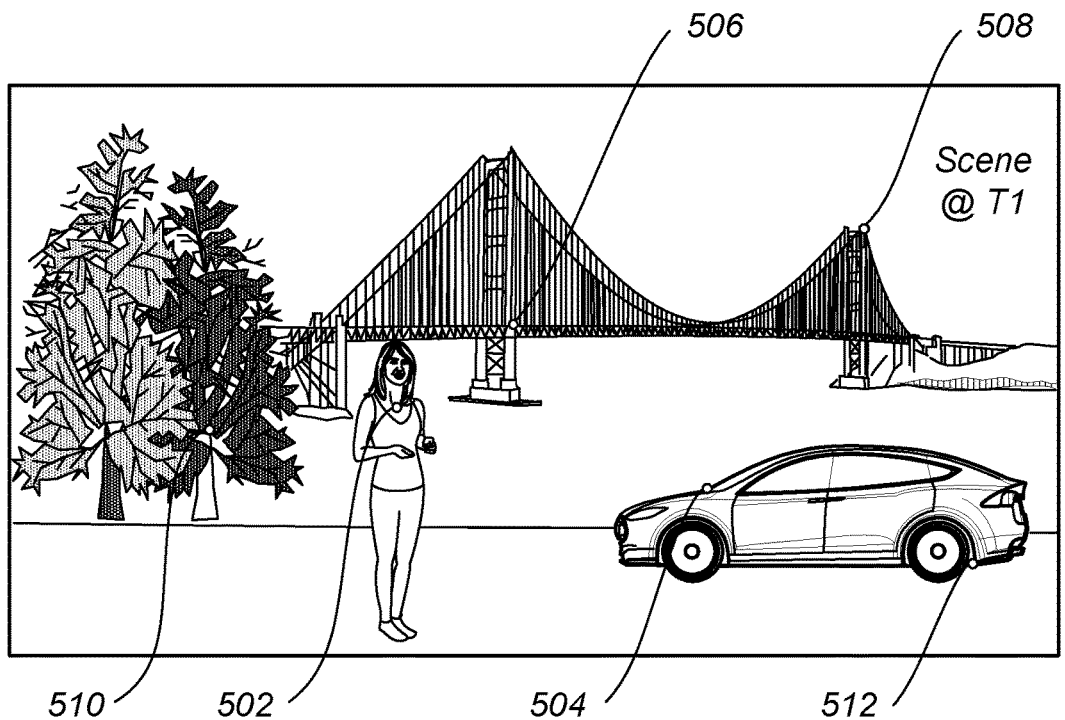
FIGS. 5A-5B illustrate an example of an image transformation between two frames using tracked control points between the two frames.
Figure 5B:
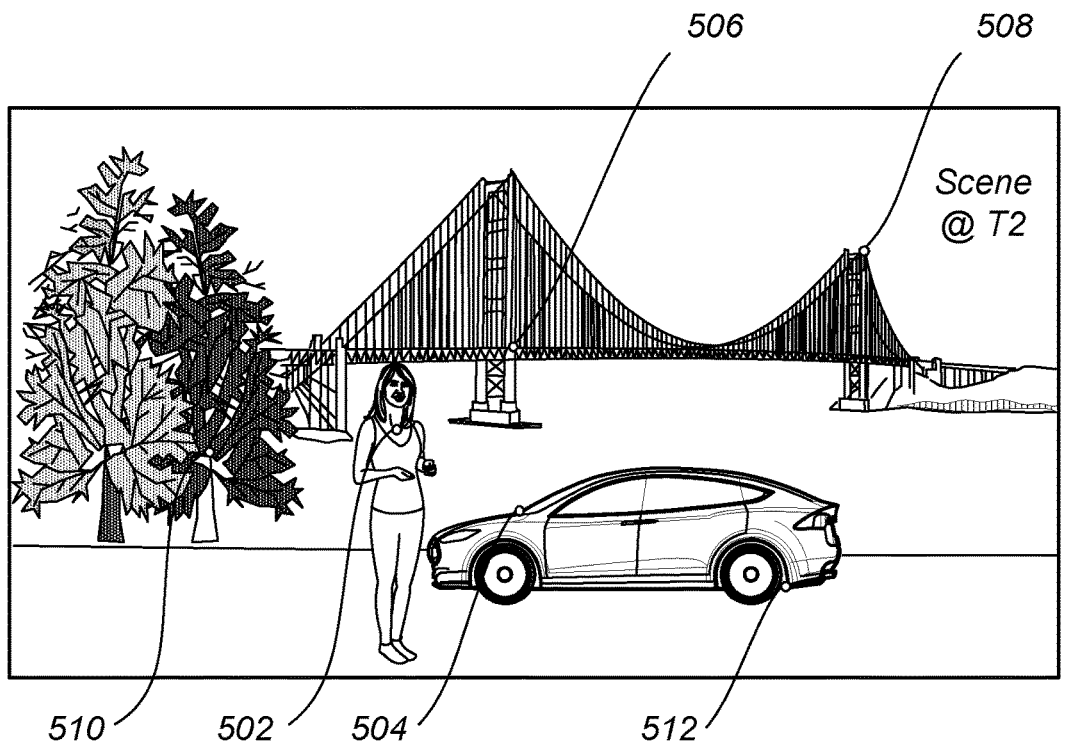

With reference to FIGS. 5A-5B, shown is an example of an image transformation between two frames using tracked control points between the two frames. In particular, FIG. 5A shows a first frame of a scene at a first time T1 and FIG. 5B shows a second frame of the scene at a second time T2. A set of control points 502, 504, 506, 508, 510, and 512 are tracked between the two frames, such that their locations are known in both frames. An intermediate frame X at x \in [0, 1] between these two frames can be generated by interpolating the location of all control points individually for x and then computing the image data for frame X by interpolating all pixel locations using those control points. In some examples, the set of control points are located within a single layer that includes particular objects viewable in the first frame and second frame. In this case, generating an artificially rendered image may include interpolating image data for multiple layers and combining these layers. In other examples, each pixel in the first frame corresponds to a control point in the set of control points. Accordingly, each pixel may be tracked and interpolated in that instance.

In some embodiments, an artificially rendered image is generated as intermediate frame X by tracking a set of control points between the first frame and the second frame, and interpolating individual control points for the third location X using the set of control points and interpolating pixel locations using the individual control points. As shown, the first frame includes a first image captured from a first location and the second frame includes a second image captured from a second location. In one example, interpolating the pixel locations includes interpolation using barycentric coordinates based on three or more control points. In another example, interpolating the pixel locations includes interpolation using splines. In yet another example, interpolating the pixel locations includes interpolation using finite elements. In yet another example, interpolating the pixel locations includes using motion of the nearest control point. In some examples, interpolating pixel locations using the individual control points includes using dense optical flow. In other examples, interpolating pixel locations using the individual control points includes using depth data.

Figure 6:
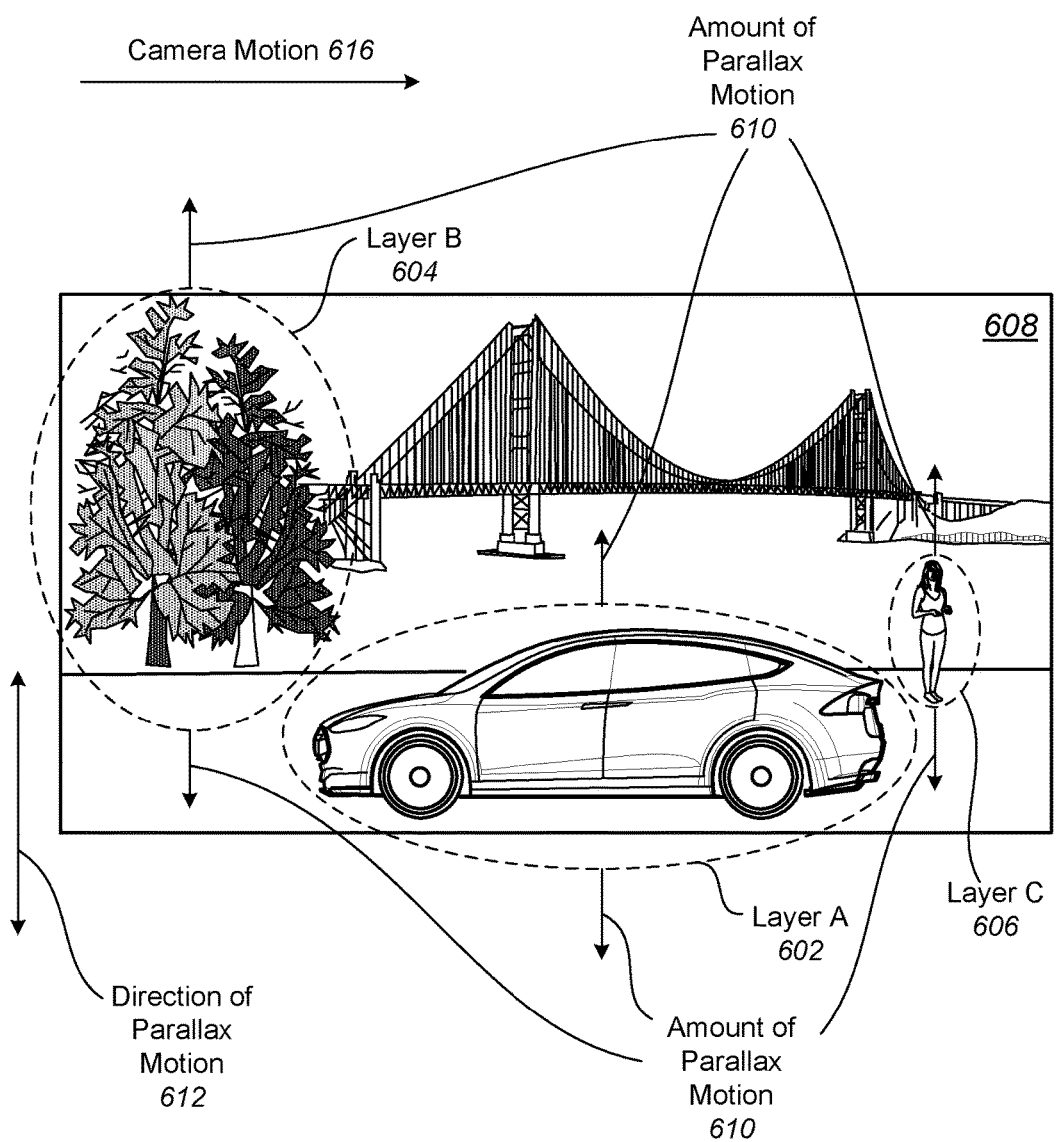
FIG. 6 illustrates an example of viewpoint extrapolation outside of the trajectory between two frames using multiple layers and the parallax effect.

With reference to FIG. 6, shown is an example of viewpoint extrapolation outside of the trajectory between two frames using multiple layers and the parallax effect. Using multiple layers, viewpoint-extrapolation outside of a trajectory between two frames can be achieved by moving the different layers in perpendicular motion to the trajectory motion. As shown, a scene 608 includes multiple layers Layer A 602, Layer B 604, and Layer C 606. Although not shown, two frames capturing images of the scene 608 can be obtained by moving a camera along camera motion 616. Comparing the two images will show parallax motion in the direction 612. As shown in the figure, the amount of parallax motion 610 of each of the layers can indicate movement or differences between the frames. Although not indicated in the figure, the different layers 602, 604, and 606 can each have different amounts of parallax motion.

In the present embodiment an artificially rendered image is generated using this parallax effect. In particular, a set of control points (not shown) is moved perpendicular to a trajectory between a first frame and a second frame. In this example, the first frame includes a first image captured from a first location and the second frame includes a second image captured from a second location and each control point is moved based on an associated depth of the control point. Specifically, control points located at a further depth are moved less than control points at a closer depth in some examples. Additionally, in some applications, each pixel in the first image corresponds to a control point in the set of control points. Furthermore, in addition to having a concrete depth associated with a point, it is also possible to infer the depth from the amount of frame-to-frame motion of the control points.

Next, an artificially rendered image corresponding to a third location outside of the trajectory is generated by extrapolating individual control points using the set of control points for the third location and extrapolating pixel locations using the individual control points. In some examples, extrapolating the pixel locations includes extrapolation using barycentric coordinates based on three or more control points. In other examples, extrapolating the pixel locations includes extrapolation using splines. In yet other examples, extrapolating the pixel locations includes extrapolation using finite elements. In other instances, extrapolating the pixel locations includes using motion of a nearest control point. In yet other instances, extrapolating pixel locations using the individual control points includes using dense optical flow.

Figure 7:
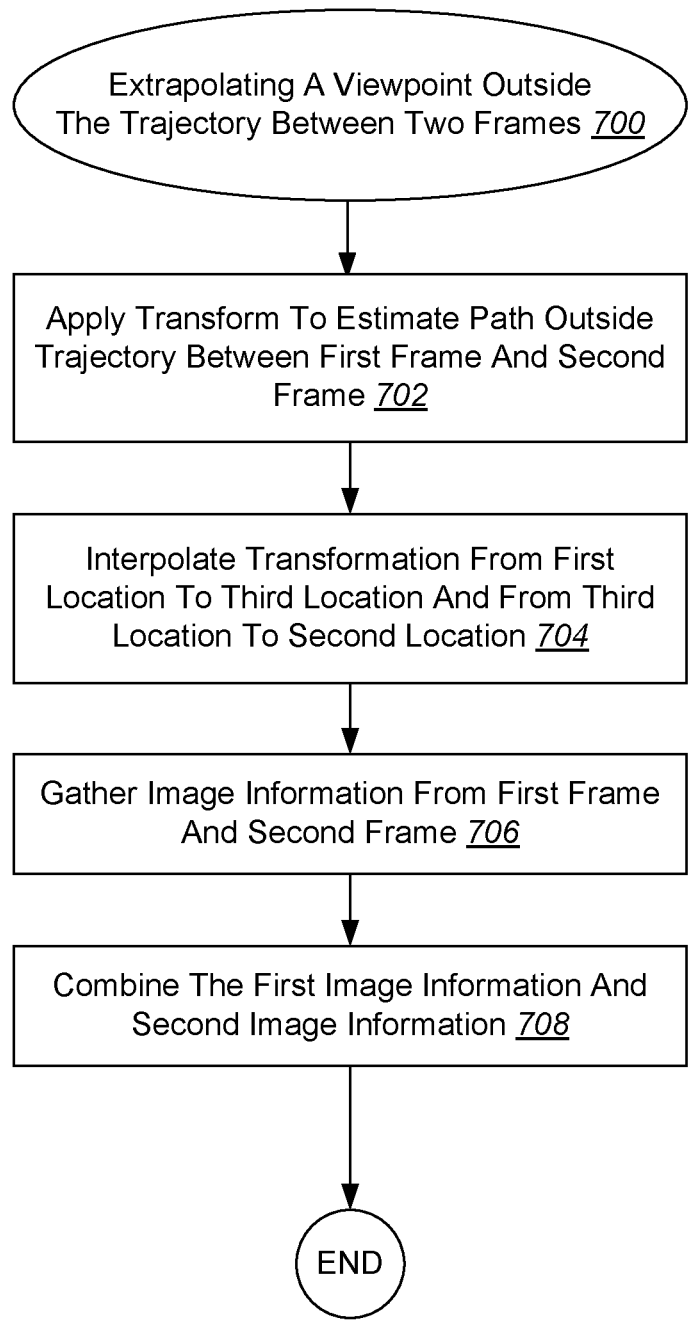
FIG. 7 illustrates an example of a process for extrapolating a viewpoint outside the trajectory between two frames.

With reference to FIG. 7, shown is an example of a process 700 for extrapolating a viewpoint outside the trajectory between two frames. This process can be viewed as an extension to the process described with regard to FIG. 3, where viewpoints for locations outside of the trajectory between Frame A and Frame B are extrapolated by applying a transform which warps the image according the curvature and direction of the estimated path.

In the present embodiment, a transform is applied to estimate a path outside the trajectory between a first frame and a second frame at 702. The first frame includes a first image captured from a first location and the second frame includes a second image captured from a second location. In some examples, the first image and second image are associated with the same layer. Furthermore, this process can be applied to various layers and the resulting images representing the layers can be combined to generate a complete image. Next, an artificially rendered image corresponding to a third location positioned on the path is generated. The artificially rendered image is generated by first interpolating a transformation from the first location to the third location and from the third location to the second location at 704. Image information is then gathered from the first frame and the second frame at 706 by transferring first image information from the first frame to the third frame based on the interpolated transformation and second image information from the second frame to the third frame based on the interpolated transformation. Finally, the first image information and the second image information is combined at 708.

According to present embodiment, the transform can implement various features. For instance, the transform can implement features such as homography, spherical projection, and/or cylindrical projection. These features can be used alone or in conjunction with one another in applying the transform. Additional features not mentioned can also be implemented within the scope of this disclosure.

The present embodiment describes one method of extrapolating a viewpoint outside the trajectory between two frames. However, additional methods for extrapolating such viewpoints can also be implemented in other embodiments. For instance, as described above with regard to FIG. 6, another way to extrapolate viewpoints for locations outside of the trajectory between two frames can include moving the layers and/or control points perpendicular to the trajectory direction based on their depth. Specifically, layers/control points at greater depth are moved less than layers/control points at lesser depth. Depending on the characteristics of the frames, different methods can be chosen to provide an appropriate result.

Figure 8:
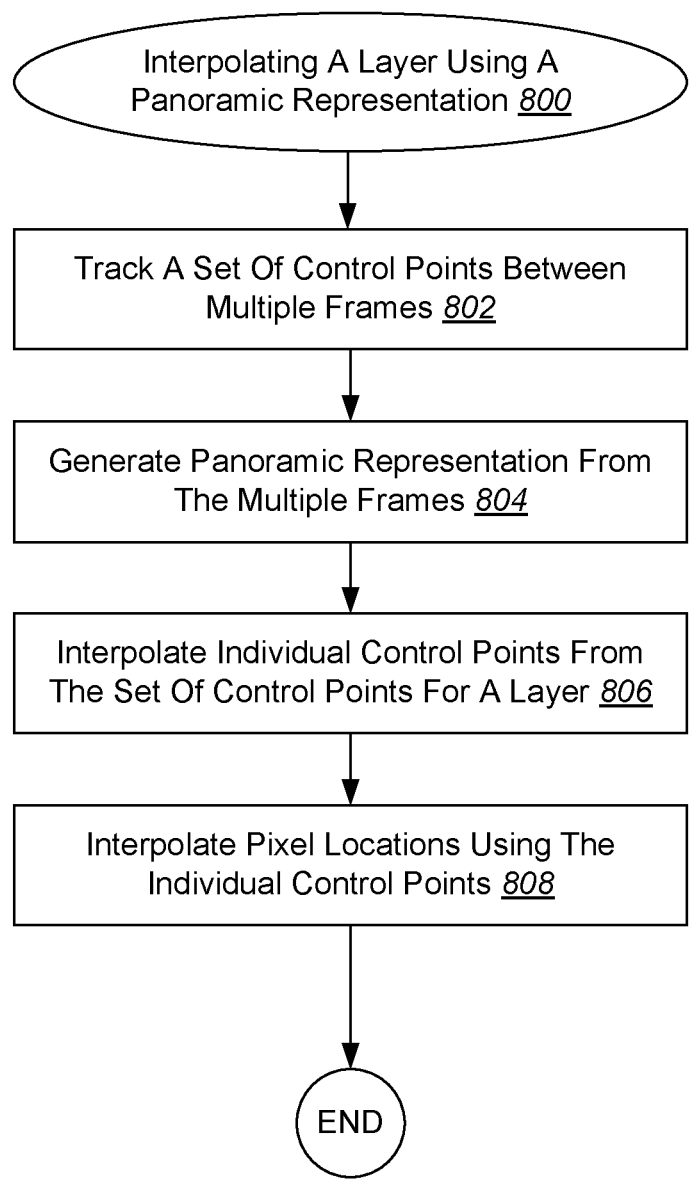
FIG. 8 illustrates an example of a process for interpolating a layer using a panoramic representation.

With reference to FIG. 8, shown is an example of a process 800 for interpolating a layer using a panoramic representation. In this example, the span of a layer is not restricted to two frames but is constructed from multiple frames. Specifically, a panorama is created from the corresponding background regions and combined into a panoramic representation. This panorama representation is then used to interpolate the corresponding layer. Although this process is described in terms of a background layer, this process can also be extended to other types of layers. For instance, the process can be applied to layers that include objects, such as context layers.

In the present embodiment, a set of control points is tracked between multiple frames associated with the same layer at 802. In some examples, each pixel corresponds to a control point in the set of control points. In these cases, each pixel is then interpolated based on the set of control points for the artificially rendered image. Next, a panoramic representation is generated from the multiple frames at 804. Individual control points are then interpolated from the set of control points at 806 for a desired frame or layer. Pixel locations are then interpolated for this frame or layer using the individual control points at 808. From this interpolation, the artificially rendered image/layer is generated.

According to various embodiments, interpolation can be implemented using a variety of methods. For instance, interpolating the pixel locations can include interpolation using barycentric coordinates based on three or more control points. In some examples, interpolating the pixel locations includes interpolation using splines. In other examples, interpolating the pixel locations includes interpolation using finite elements. In yet other examples, interpolating the pixel locations includes using motion of a nearest control point. In addition, interpolating pixel locations using the individual control points includes using dense optical flow in some applications. Although particular examples of interpolation methods are described, any combination of these or other methods can be used.

Figure 9:
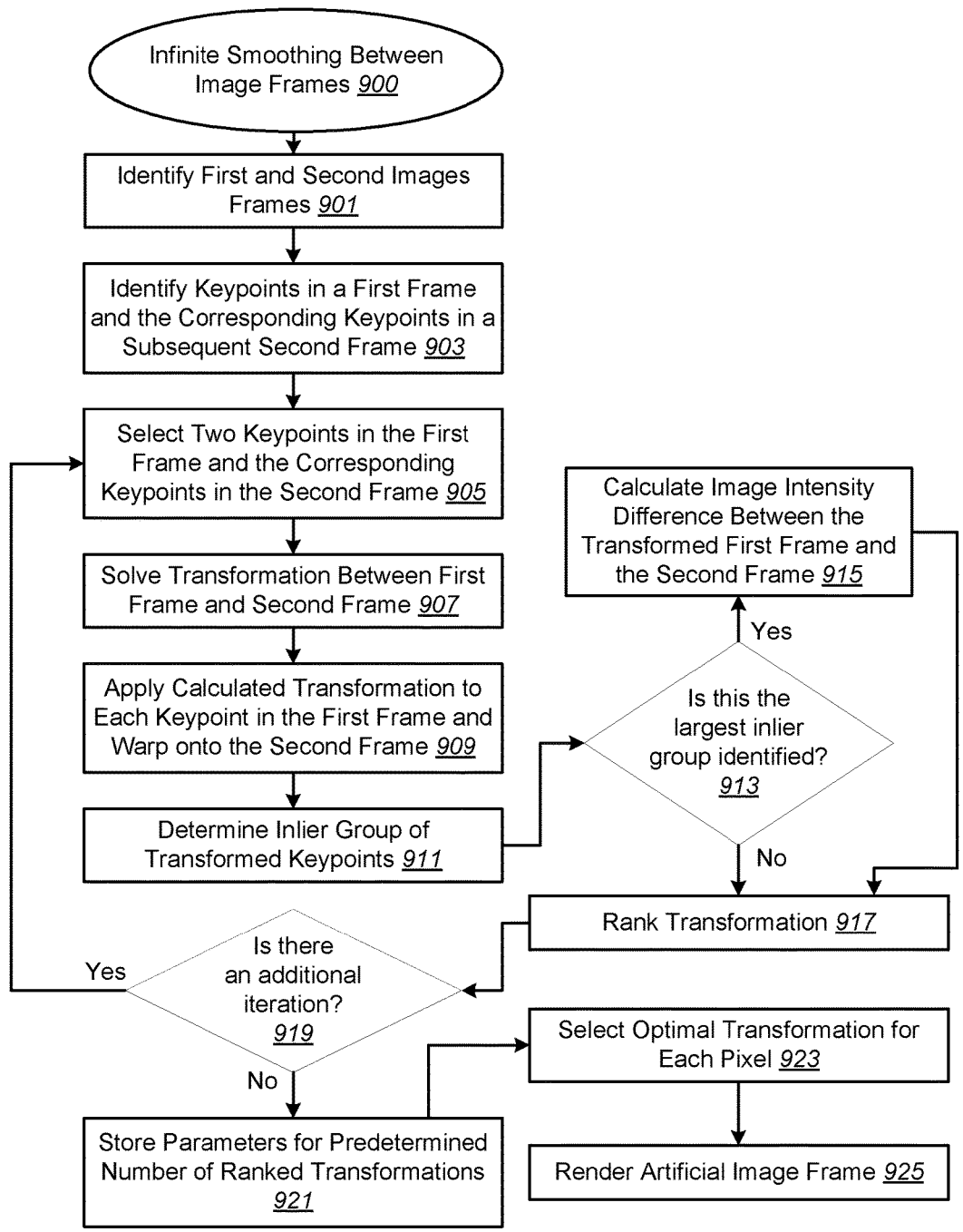
FIG. 9 illustrates an example of a method for infinite smoothing between image frames, in accordance with one or more embodiments.

With reference to FIG. 9, shown is an example of a method 900 for infinite smoothing between image frames, in accordance with one or more embodiments. In various embodiments, method 900 may be implemented as one or more various steps in method 300, such as estimating transformation at step 302 and/or interpolating the transformation at step 304. In various embodiments, process 900 may be implemented to parameterize a transformation, such as T_AB, described with reference to FIG. 1, for interpolation those parameters during runtime.

At step 901, first and second image frames are identified. In some embodiments, the first and second image frames may be part of a sequence of images captured as described with reference to FIG. 1. In various embodiments, the image frames may be consecutively captured images in time and/or space. In some embodiments, the first and second image frames may be adjacent image frames, such as frame N and frame N+1. The method 900 described herein may be implemented to render any number of frames between N and N+1 based on the position of the user and/or viewing device.

A RANSAC (random sample consensus) algorithm may be implemented to determine the possible transformation candidates between the two image frames. As described herein, transformation candidates may be identified from keypoints tracked from a first frame to a second frame. Various transformations may be calculated from various different parameters gathered from various combinations of keypoints. At step 903, keypoints in the first frame and corresponding keypoints in the second frame are identified. In some embodiments, the first frame includes an image that was captured before the image in the second frame. In other embodiments, the first frame may include an image captured after the image in the second frame. In various embodiments, keypoints may be identified using a Harris-style corner detector algorithm or other keypoint detection method. In other embodiments, various other corner detection algorithms may be implemented, such as a Moravec corner detection algorithm, a Forstner corner detector, etc. Such corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. For example, 1,000 keypoints may be identified and selected on the first frame. The corresponding 1,000 keypoints on the second frame can then be identified using a Kanade-Lucas-Tomasi (KLT) feature tracker to track keypoints between the two image frames.

At step 905, two keypoints in the first frame and the corresponding keypoints in the second frame are selected. In some embodiments, the two keypoints in the first frame may be selected randomly by the RANSAC algorithm. The two corresponding keypoints in the second frame may be identified by the KLT feature tracker. In some embodiments, two keypoints may be randomly selected in the second frame and the corresponding keypoints in the first frame are identified. Each pair of corresponding keypoints may be referred to herein as a correspondence. For example, keypoint A on frame N and keypoint A' on frame N+1 correspond to each other via KLT feature tracking and may comprise a pair (A, A'). A second correspondence (B, B') may be selected at step 1105 which comprises keypoint B on frame N and keypoint B' on frame N+1.

Based on the two keypoint correspondences, a transformation is determined between the first frame and the second frame, at step 907. In some embodiments, a set of two keypoint correspondences are used to determine a transformation. In other words, a transformation, T1, between the first frame and second frame may be calculated from the two corresponding pairs of keypoints using a predetermined algorithm. Various parameters may be used to calculate the transformation between corresponding keyframes by a predetermined algorithm. In one example embodiment, similarity 2D parameters, including x and y translations, a 2D rotation, and a 2D scale, may be used to determine the translation. Other parameters that may be used include 2D translation (x and y translation), 2D Euclidean paramters (2D rotation and x,y translation), affine, homography, etc. As another example, a mathematical model may be used, such as that provided in M. Brown, R. Hartley, and D. Nister. Minimal solutions for panoramic stitching. In Proceedings of the International Conference on Computer Vision and Pattern Recognition (CVPR07), Minneapolis, June 2007. In order to calculate a transformation based on rotation and focal length, four parameters are required: three for rotation and one for focal length. In the above examples, four constraints can be provided by the two correspondences for each selected keypoints between frames. The derived close-form solution is the calculated transformation based on the two selected keypoint correspondences.

At step 909, the calculated transformation T1 is applied to each keypoint in the first frame which is warped onto the second frame. In other words, all keypoints in the first frame are transformed to the second image via applying the calculated transformation. The transformation is reversible and in some embodiments, the keypoints in the second frame may be transformed onto the first frame after the calculated transformation is applied to keypoints in the second frame. At step 911, an inlier group of transformed keypoints is determined. In some embodiments, a transformed keypoint in the first frame is considered an inlier if the transformation T1 correctly transforms the keypoint to match the corresponding keypoint in the second frame. In some embodiments, this can be determined by computing the L2 distance between a transformed keypoint and its corresponding keypoint on the second image. For example, a transformed keypoint on a first frame N may be denoted as K^ and its corresponding keypoint on the second frame N+1 may be denoted as K'. The L2 distance is computed as ‖A^-A'‖, which corresponds to the distance between two 2D points. If the distance between any keypoint correspondence is within a predetermined threshold distance in any direction, then the correspondence will be determined to be an inlier. In other words, if the difference between any keypoint correspondence is greater than the predetermined threshold distance, then the keypoint will be determined to be an outlier.

For example, the threshold distance may be a threshold pixel distance, which is the L2 distance between two keypoints in a correspondence. Thus, if the distance between a keypoint K^ and its corresponding keypoint K' is more than 2 pixels, then that keypoint correspondence will be determined to be an outlier based on the transformation applied at step 909. In various embodiments, the threshold pixel distance may be a function of image resolution and can scale linearly. For example, method 900 may be processing images at a 320×180 pixels resolution and use a threshold pixel distance of 2 pixels. However, if method 900 is used to process images at a 1080p (1920×1080 pixels) resolution, then a threshold pixel distance of 6-8 pixels may be used. In some embodiments, a different threshold pixel distance may be chosen for a given image resolution. In some embodiments, the threshold pixel distance may be empirically determined based on experimental results of accuracy.

After all keypoint correspondences have been measured as such, it is determined at step 913 whether the calculated transformation T1 resulted in the largest inlier group compared to previous transformations. If the transformation T1 applied at step 909 does not result in the largest group of inlier keypoints, the calculated transformation T1 is ranked at step 917. In other words, if a larger inlier group was identified based on a previous transformation, T0, calculated at step 907 and applied at step 909, then the current calculated transformation T1 is ranked against the previous transformation T0. In some embodiments, the transformations are then ranked based on the size of the resulting inlier group. For example, a transformation resulting in a larger inlier group may be ranked higher than a transformation resulting in a smaller inlier group.

If the transformation T1 determined at step 907 results in the largest group of inlier keypoints than any previous transformation T0, then the image intensity difference between the transformed first frame and the second frame is calculated at step 915. In some embodiments, the calculated transformation T1 may be applied to every pixel in the first frame to warp the first frame onto the second frame, and an image intensity difference is calculated between the transformed first frame and the second frame. For example, an error or difference for each color channel is calculated between each corresponding pixel in the two frames. Then an average error of the RGB value of all color channels is derived for each pixel. Next, the average error for all pixels within the first and second frames is calculated. In some embodiments, the image intensity difference between two frames will be between 0 and 255. A lower image intensity difference value corresponds to a closer image match between frames, and consequently a more accurate transformation. If the transformation T1 calculated at step 907 is the first calculated transformation within the RANSAC algorithm, then it may necessarily result in a largest group of inlier keypoints and the image intensity different resulting from that transformation will be calculated at step 915.

The transformation T1 may then be ranked at step 917. In some embodiments, the transformation T1 is ranked against a previous transformation T0 that previously resulted in the largest inlier group. If transformation T1 results in a lower image intensity difference, then it may be ranked higher than transformation T0. If transformation T1 results in a high image intensity difference, then it may be ranked lower than transformation T0. If image intensity difference results from other previous transformations have also been calculated, transformation T1 may be ranked against such previous transformations based on its resulting image intensity difference.

In some embodiments, by calculating image intensity difference at step 915 only when a new largest resulting inlier group is determined, processing time may be faster because the system does not need to calculate image intensity difference for every transformation solved at step 907. However, in some embodiments, step 915 is implemented to calculate the image intensity difference for all transformations determined at step 907, regardless of inlier group size. In such embodiments, all transformations may be ranked based on resulting image intensity difference.

There may be instances where a larger inlier group is determined at step 913, but a higher image intensity difference value is calculated at step 915. In this instance, the transformation resulting in the higher image intensity difference value will be discarded. Alternatively, the transformation resulting in the larger inlier group may be stored in some embodiments. Such instances are more likely to occur in instances where stabilization of foreground is desired in image frames that include large textured background regions. Accordingly, the RANSAC algorithm may result in calculated transformations that include large inlier keypoint sets that correspond to the large background, instead of the foreground. This may result in higher intensity error in the foreground region. To compensate for this in some embodiments, the RANSAC algorithm may measure focal length and rotation using only keypoints located in the foreground of an image. A background keypoint removal may be performed on the image frames within a sequence of images before the RANSAC algorithm is implemented. Keypoints corresponding to the background of an image may be identified based on IMU data to calculate how such keypoints with focal points at infinity should move between frames. Once identified, such background keypoints are removed, such that the RANSAC algorithm calculated transformations at step 1107 using only keypoints corresponding to the foreground. This may reduce undesired transformations resulting in larger inlier groups (aligning the background), but higher image intensity difference values (from unaligned foreground). Such background keypoint removal may also be used with concave surround views, such as the surround view depicted in FIG. 6B. In convex panoramic surround views, calculating transformations from keypoints corresponding to the background and the foreground may be desired.

In some embodiments, step 915 is only implemented if a new largest inlier group is determined at 913. The transformation calculated at step 907 in a first iteration of the RANSAC algorithm may necessarily result in the largest inlier group. In other embodiments, step 915 may be implemented if the inlier group determined at 913 is at least equal to the largest inlier group resulting from a previous transformation. In rare instances, a subsequent transformation calculated at step 907 may result in the same inlier group size, as well as the same image intensity difference. In such instance, the transformation calculated first may be ranked higher at step 917. In other embodiments, the subsequent transformation is kept while the previous transformation discarded.

It is then determined whether the RANSAC algorithm includes an additional iteration for sampling additional keypoint correspondences for solving subsequent transformations at 919. The RANSAC algorithm of method 900 may be configured to continue for any number of cycles in which it randomly samples sets of keypoint correspondences. For example, the RANSAC algorithm may perform steps 905 through 917 one hundred times for two adjacent frames. However, the RANSAC algorithm may be performed any number of cycles desired.

If it is determined that there are additional iterations for the RANSAC algorithm at step 919, method 900 may return to step 905 to select another two correspondence of keypoint pairs. In some embodiments, keypoint correspondences may be selected randomly. In other embodiments, corresponding keyframes may be selected by location. Subsequently selected keypoint correspondences may include different randomly selected pair of keypoints in the first frame. In some instances, randomly selected keypoint correpsondences may be correspondences that were previously selected at step 1105. For example, correspondence (A, A') and a third corresponding keypoint pair (C, C') may be selected in the second iteration of the RANSAC algorithm. In even rarer occasions, the same exact keypoint pairs may be selected in subsequent iterations of the RANSAC algorithm. For example, a subsequent iteration of the RANSAC algorithm may again select correspondences (A, A') and (B, B'). In this case, the resulting inlier group size and calculated image intensity difference would be identical to the previously calculated transformation based on the previous iteration. In this instance, the first transformation will be ranked higher at step 917 and the subsequent iteration involving the same calculated transformation will be ranked lower. However, the probability of such occurrence may be very unlikely depending on the number of keypoints identified on an image frame, for example, 1,000 keypoints. Thus, the chance occurrence of this instance can simply be ignored.

The result of method 900 is list of transformations between the first frame and the second frame, ranked based on the resulting inlier keypoint group size and/or image intensity difference when the transformation is applied to the first frame and warped onto the second frame, or vice versa. The optimal transformation between the two adjacent frames may then be used to compose a trajectory for the image sequence at step 1005 of method 1000.

Once all iterations of the RANSAC algorithm have been run, parameters are stored for a predetermined number of highest ranked transformations at step 921. In various embodiments, a predetermined number of highest ranking transformations are selected to be transformation candidates. For example, the eight highest ranked transformations solved at step 907 may be selected as transformation candidates. As previously described, the transformations may be ranked by largest resulting inlier keypoint group and/or smallest resulting image intensity difference. In some embodiments, the remaining transformations solved at step 907 are discarded. Any number of transformation candidates may be selected. However, in some embodiments, the number of transformations selected as transformation candidates is a function of processing power.

For example, eight candidates may be selected from transformations solved using similarity 2D parameters. Thus, for the transition between frame N and N+1, eight sets of four parameter vectors are stored. As previously described, the transformation parameters based on similarity 2D parameters include x and y translations, 2D rotation, and 2D scale. Thus, 32 parameter vectors may be stored for each transition between frames. In some embodiments, processing time may increase linearly with increased number of candidates. In some embodiments, steps 903 to 921 are run offline. In some embodiments, steps 903 to 921 are run in real-time, as image frames are captured.

At step 923, the optimal transformation candidate is selected for each pixel. Each pixel in an image may experience a different optimal transformation between frames. In some embodiments, each of the transformation candidates is applied to each pixel. The transformation candidate that results in the least difference between pixels from each frame may be selected. For example, an artificial frame N+0.5 may be rendered based on user selection. In some embodiments, user selection may correspond to the location a viewing device. In other embodiments, user selection may correspond to user input on a viewing device, such as by swiping a screen left or right to change the viewing location. For example, as described in U.S. patent application Ser. No. 14/530,669, previously referenced above, a user action may be received to view the object of interest from a desired viewpoint. This user action can include moving (e.g. tilting, translating, rotating, etc.) an input device, swiping the screen, etc., depending on the application. For instance, the user action can correspond to motion associated with a locally concave surround view, a locally convex surround view, or a locally flat surround view, etc. Based on the characteristics of the user action, the three-dimensional model may be processed. For instance, movement of the input device can be detected and a corresponding viewpoint of the object of interest can be found. Depending on the application, the input device and output device can both be included in a mobile device, etc. In some examples, the requested image corresponds to an image captured prior to generation of the surround view. In other examples the requested image is generated based on the three-dimensional model (e.g. by interpolation, etc.).

In some embodiments, each of the eight transformation candidates is applied to each pixel in the first frame and second frames. In some embodiments, each transformation candidate is applied to a pixel in the first frame N and a corresponding pixel in the second frame N+1 to linearly interpolate each pixel to the desired frame location, such as N+0.5. The corresponding pixels are then compared to determine how closely the two interpolated pixels match in order to determine the optimal transformation candidate for such pixels.

For example, a transformation candidate is applied to a pixel in the first frame N, and the translation, rotation, and scale may be linearly interpolated for the N+0.5 frame location. Then the transformation candidate is applied to a pixel in the second frame N+1, and the translation, rotation, and scale may be linearly interpolated in reverse for the N+0.5 location. Both interpolated pixels may then be compared to measure an image intensity difference based on the RGB values for each pixel.

In some embodiments, the optimal transformation candidate corresponds to the transformation that results in the lowest image intensity difference between the two interpolated pixels. In some embodiments, all transformation candidates may be applied to each pixel in an image frame, and all resulting image intensity differences are compared. If the same image intensity difference results from different applied transformation candidates, the first transformation candidate applied may be selected as the optimal transformation candidate in certain embodiments. In further embodiments, transformation candidates may be sequentially applied to a pixel until a transformation candidate results in an image intensity difference below a certain predetermined threshold value, at which point it is selected as the optimal transformation.

In some embodiments, each transformation candidate is applied to linearly interpolate each pixel on the first frame N to the second frame N+1. The resulting interpolated pixel is then compared to the corresponding pixel in the second frame N+1 to determine the image intensity difference as described above. In other embodiments, each of the transformation candidates is applied to a group, or "community," of pixels. For example, a community of pixels may comprise a 7×7 (−3, +3) group of pixels.

In some embodiments, a graphics processing unit (GPU) is used to implement step 923. The GPU may be a specialized processing unit that is included in a viewing device, such as GPU 1509 described below with respect to FIG. 15. In some embodiments, each pixel is processed as a separate thread of the GPU. Thus, time complexity of the processing time for each pixel is at constant time, bounded by O(1) and not O(n), where n is the number of processed elements (or pixels). This causes the processing time to be the same regardless of the size of the image being interpolated because the process is bounded by a value that does not depend on the size of the input.

Once an optimal transformation candidate is determined for each pixel, an artificial image may be rendered at step 925 using the optimal transformation. In some embodiments, step 925 may also be implemented by the same GPU as described above. In other embodiments, an a different processing unit may be used to render the interpolated image. As previously described, in various embodiments, steps 923 and 925 may be performed on-the-fly during runtime when the user is viewing the sequence of images. In such embodiments, the applied transformation may be a function of frame number of the frame between N and N+1. The number of frames between N and N+1 may be determined based on various considerations, such as the speed of movement and/or the distance between frames N and N+1. For example, if a user selection corresponds to slower swipes and/or movement of the image location, then more artificial frames may be rendered, such as every 0.1 translation between N and N+1. However, if a user selection corresponds to faster swipes and/or movement of the image location, then fewer artificial frames may be required, such as every 0.25 translation between N and N+1.

As described, one or more steps in method 900 may be performed offline before a user accesses the image frames to view a surround view. However, various embodiments, one or more steps in method 900 may be performed during runtime. In some embodiments, all steps may be performed during runtime.

Because method 900 may generate any number of frames between frames N and N+1, the user may perceive a smooth transition as the user view different viewpoints of the three-dimensional model of an object of interest, as an image frame may be rendered for virtually any viewpoint position the user is requesting to view. Furthermore, because the artificial image frames may be rendered based only on the calculated transformation parameters stored at step 921, storage of additional artificially rendered image frames is not required. This enhances the functioning of image processing computer systems by reducing storage requirements.

Method 900 may then be implemented for the transition between each image frame in the sequence. Various embodiments of method 900 may provide advantages over existing methods of rendering artificial images, such as alpha blending. Especially in the case of concave surround views, existing methods result in artifacts or ghosting effect from improperly aligned image frames. This occurs because unlike convex surround views, concave and/or flat surround views do not experience a single transformation for all pixels and/or keypoints. Method 900 provides a process for determining the optimal transformation out of multiple transformation candidates to apply to a pixel. Additionally, method 900 may generate image frames that are seen, as well as portions of image frames that are unseen. Thus, motion between two discretized image frames may be generated by selecting the frame that includes the least amount of conflict.

Furthermore, by providing multiple transformation candidates to be selected during runtime, method 900 provides the ability for optical flow discretization. In other words, which optical flow to use is determined at runtime, unlike existing processes where the optical flow is determined first. Such existing methods establish an optical flow first before determining one or more optimal transformations to be applied. However, this precludes the option to apply a one or more different optical flows other than the precomputed optical flow. Because method 900 allows a different optical flow to be utilized in interpolation of each pixel, an otherwise incorrect optical flow may be used to render a correct image result if the transformation results in the lowest image intensity difference value. This may reduce the probability of artifacts, which may occur in existing methods, even when a correct optical flow is used.

The same principal may also allow the interpolated frames to clearly depict motion occurring between image frames. For example, if an object of interest, or other content and/or context, is moving as the frames for the surround view are captured, there may be a non-linear trajectory in the optical flow because pixels corresponding to a moving object within a sequence of images may not follow a linear translation, such as the translation of the camera. Thus, existing methods, such as alpha blending, can lead to artifacts because there may not be any overlapping subject matter between two frames for a moving object. However, the option to select from various different transformation candidates in method 900 may allow for non-linear motion capture, which can interpolate non-overlapping subject matter.

Figure 10A:
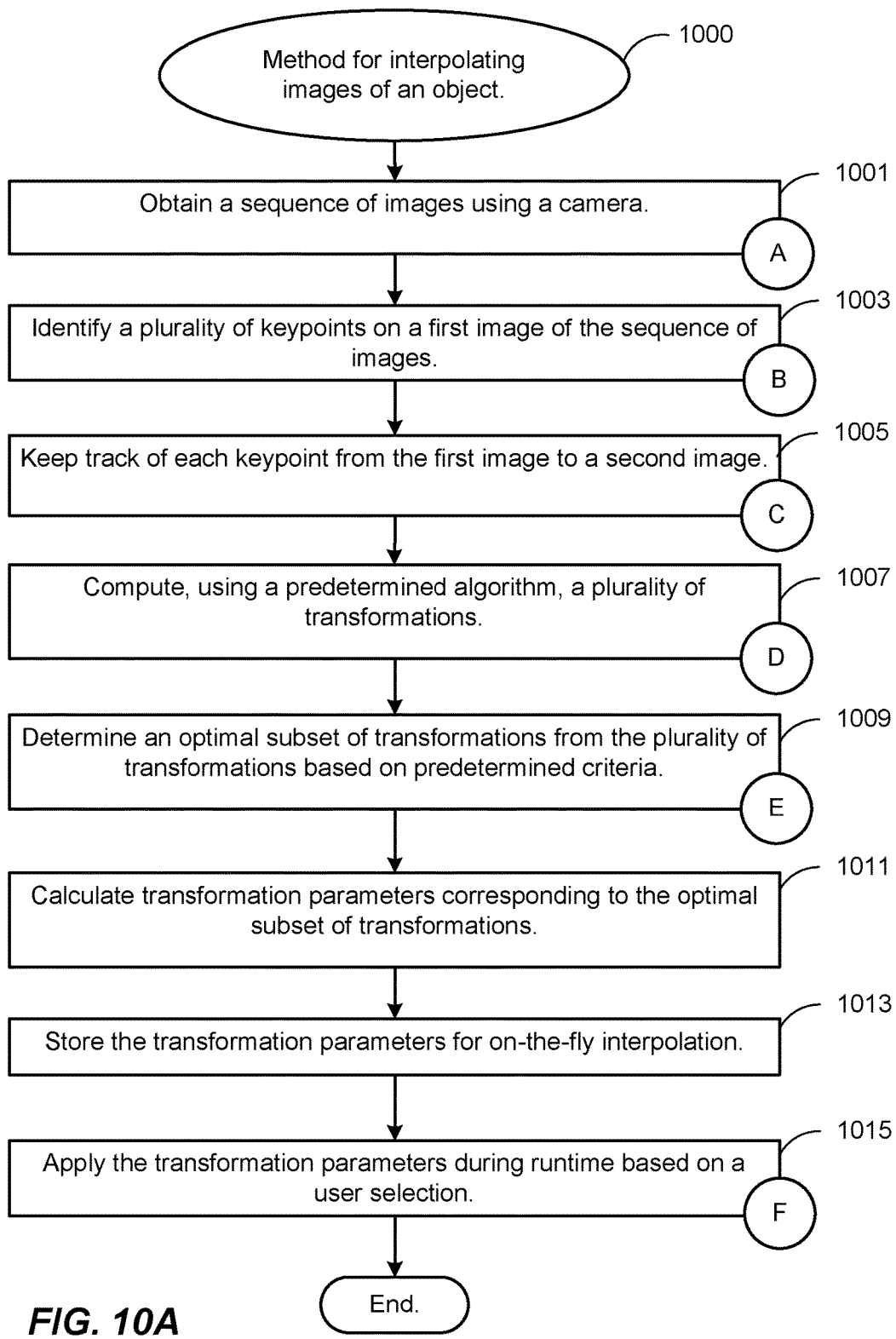
FIGS. 10A-10C illustrate an example method for interpolating images of an object, in accordance with one or more embodiments.
Figure 10B:
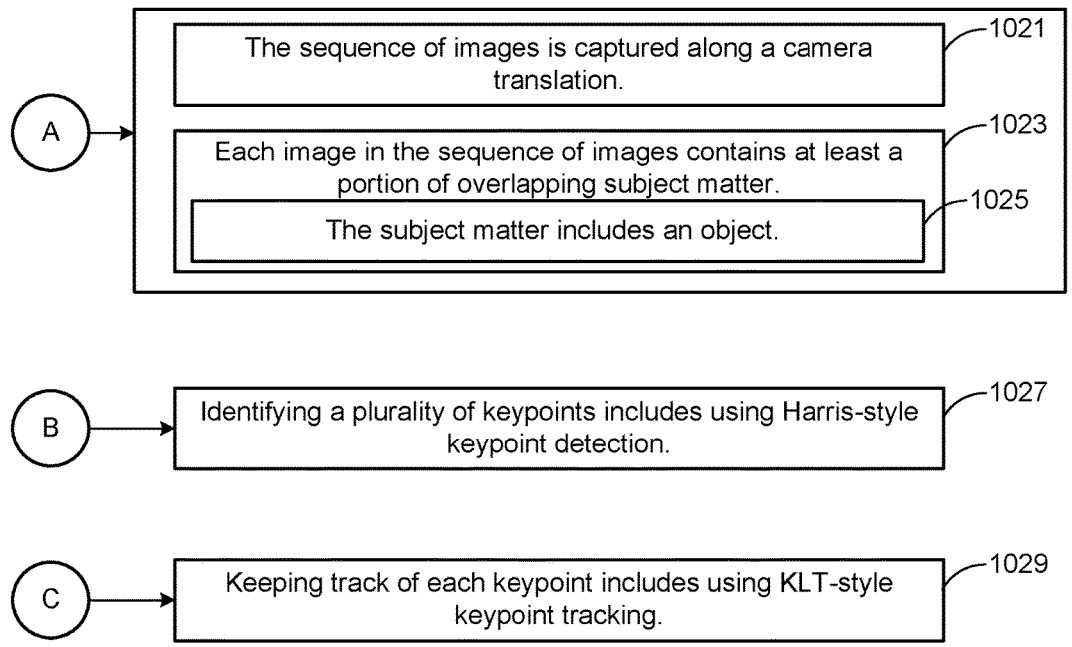
Figure 10C:
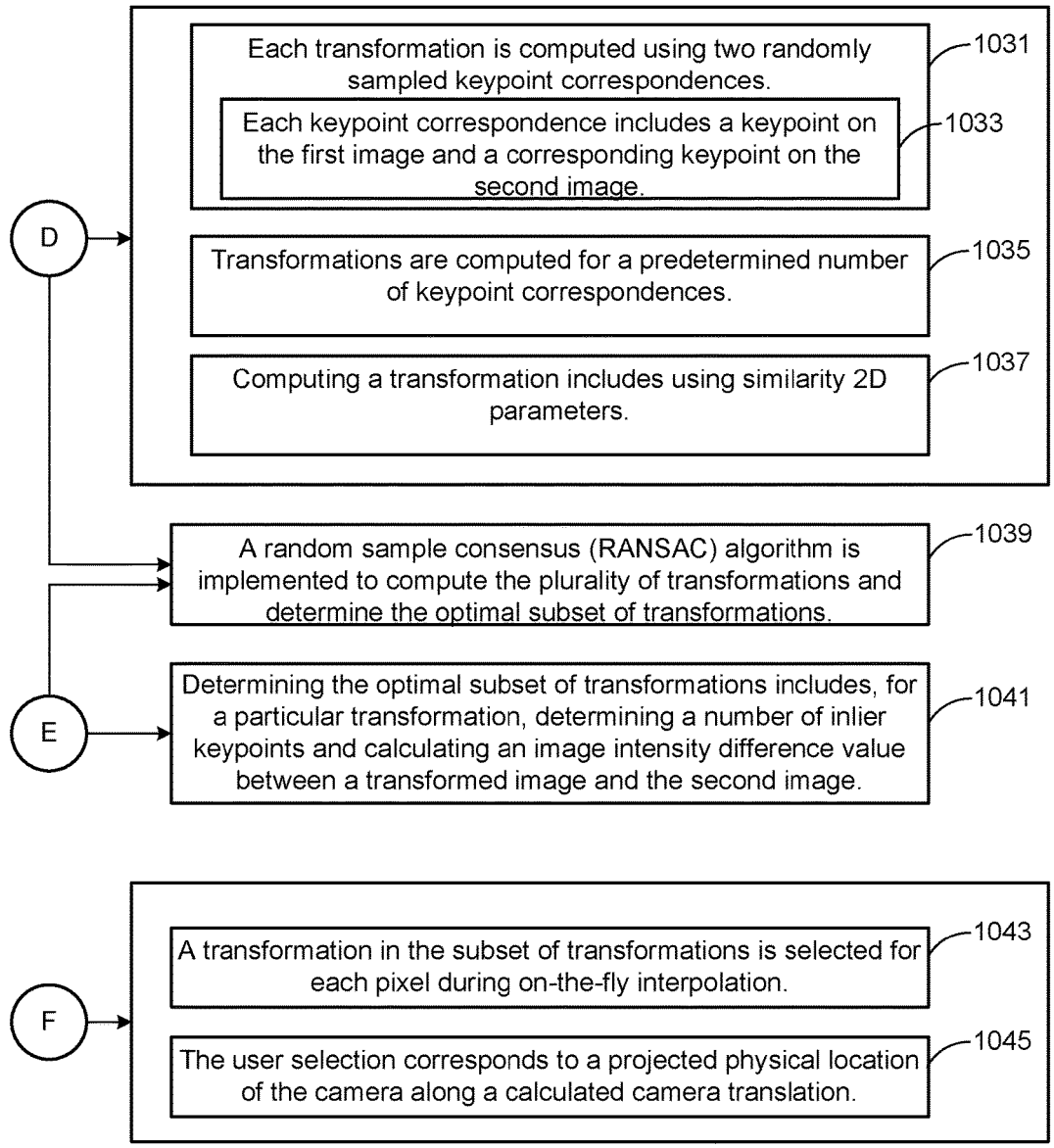

With reference to FIGS. 10A-10C, shown is an example method 1000 for interpolating images of an object, in accordance with one or more embodiments. At operation 1001, a sequence of images is obtained using a camera, such as described with reference to FIG. 1. In some embodiments, the sequence of images is captured along a camera translation 1021. For example, the camera translation 1021 may be a linear translation around an object of interest, such as a concave arc around an object of interest, such as object 108. In other embodiments, camera translation 1021 may be a convex arc capturing a panoramic surround view. In yet further embodiments, camera translation 1021 may be a linear motion capturing a locally flat surround view, in which the rotation of the camera is small compared to the translation. In further embodiments, camera translation 1021 may comprise a multi-directional motion capturing a light field comprising images of an object from various angles.

In some embodiments, each image in the sequence of images contains at least a portion of overlapping subject matter 1023. In some embodiments, the subject matter 1023 includes an object 1025. For example, object 1025 may be an object of interest 108, as described in FIG. 3. In some embodiments, the subject matter 1023 may additionally, and/or alternatively, include context scenery such as objects 110, as described in FIG. 1, or other context.

As previously described with reference to step 903, keypoints in a first frame and corresponding keypoints in a second frame are identified at operations 1003 and 1005. At operation 1003, a plurality of keypoints is identified on a first image of the sequence of images. In some embodiments, identifying a plurality of keypoints includes using Harris-style keypoint detection 1027. At operation 1005, each keypoint is kept track of form the first image to a second image. In some embodiments, keeping track of each keypoint includes using KLT-style keypoint tracking 1029.

At operation 1007, a plurality of transformations 1031 is computed using a predetermined algorithm, such as described with reference to step 907. In some embodiments, each transformation 1031 is computed using two randomly sampled keypoint correspondences 1033. Each keypoint correspondence 1033 may include a keypoint on the first image and a corresponding keypoint on the second image. In some embodiments, transformations 1031 are computed for a predetermined number 1035 of keypoint correspondences 1033. For example, a random sample consensus (RANSAC) algorithm may be configured to select 1,000 sets of two keypoint correspondences, which are used to compute transformations 1031 and determine an optimal subset of transformations 1041, further described below.

In some embodiments, computing a transformation 1031 includes using similarity 2D parameters 1037. As previously described, other parameters may be used, including 2D translation, 2D Euclidean parameters, affine, homography, and/or rotation and focal length. At operation 1009, an optimal subset of transformations 1041 is determined from the plurality of transformations 1031 based on predetermined criteria, such as described with reference to steps 909 to 919. For example, determining the optimal subset of transformations 1041 may include, for a particular transformation 1031, determining a number of inlier keypoints and calculating an image intensity difference value between a transformed image and the second image. In some embodiments, a random sample consensus (RANSAC) algorithm 1039 is implemented to compute the plurality of transformations 1031 and determine the optimal subset of transformations 1041.

At operation 1011, transformation parameters corresponding to the optimal subset of transformations 1041 is calculated. At operation 1013, the transformation parameters are stored for on-the-fly interpolation 1043, such as described with reference to step 921. At operation 1015, the transformation parameters are applied during runtime based on a user selection 1045, such as described with reference to step 923. In some embodiments, a transformation in the subset of transformations 1041 is selected for each pixel during on-the-fly interpolation 1043. In some embodiments, the user selection 1045 corresponds to a projected physical location of the camera along a calculated camera translation. For example, a user may make a user selection 1045 of a particular camera location during runtime, such as by swiping the screen of a viewing device. The system may then determine, on-the-fly, the optimal transformation for each pixel based on that camera location and render the correct image in real-time.

As previously described, a non-linear surround view may be created to display portions of an object or other scenery in more than one linear dimension. In some embodiments, image frames may be captured at multiple viewpoints around an object to allow for multi-directional camera location selection. The captured images may be organized as a multi-direction structured image array, which may allow smooth navigation through the capture space. In some embodiments, such image array may correspond to a light field comprising a plurality of images of an object from various viewpoints along a non-linear camera translation. In various embodiments, a light field corresponds to an arrangement of overlapping images that correspond to physical locations in space. In further embodiments, the image array may be represented as a 2D graph of nodes, where each node corresponds to key image frames at particular camera locations.

Figure 11:
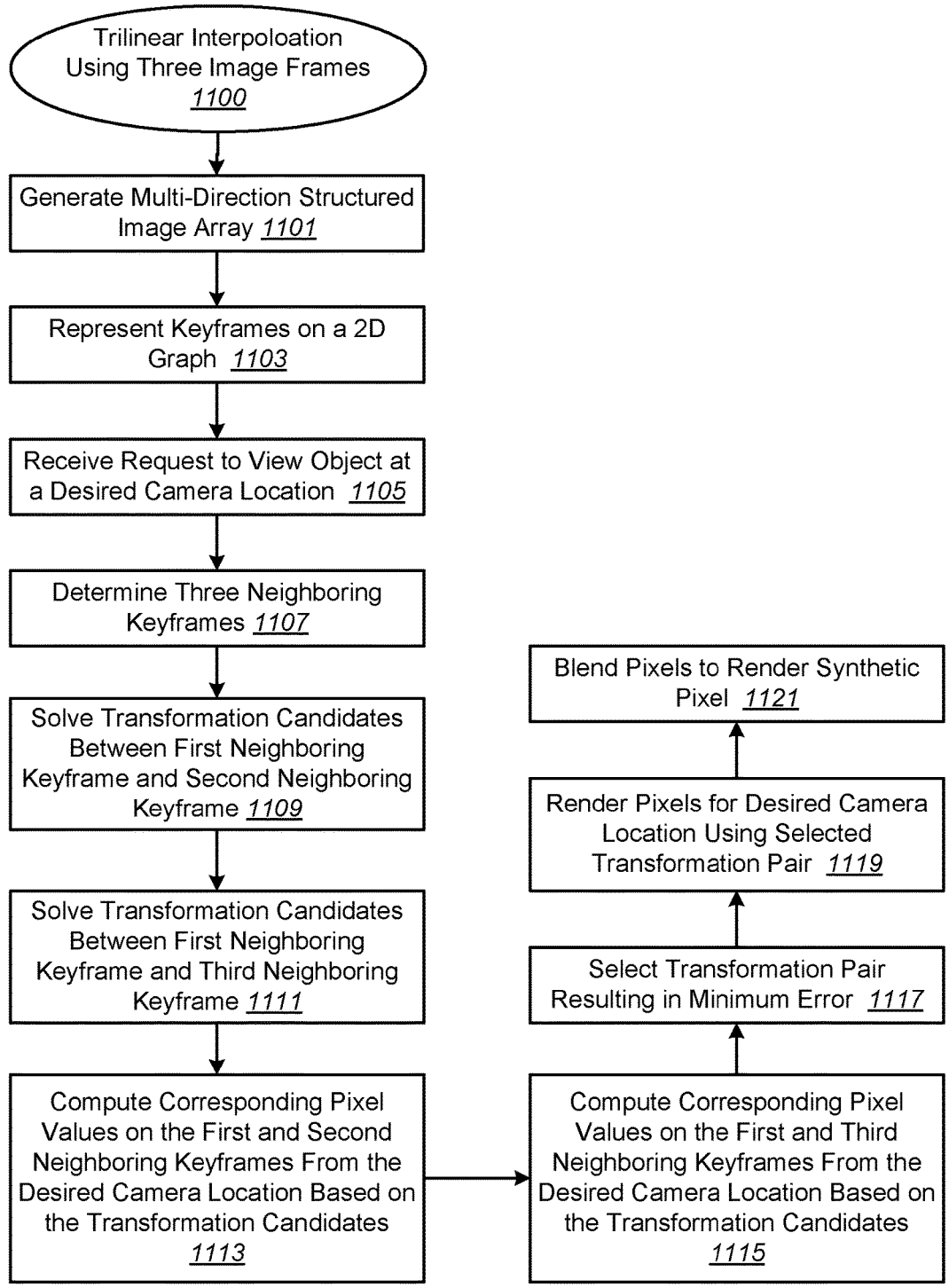
FIG. 11 illustrates an example method for trilinear interpolation using three image frames, in accordance with one or more embodiments.
Figure 12A:
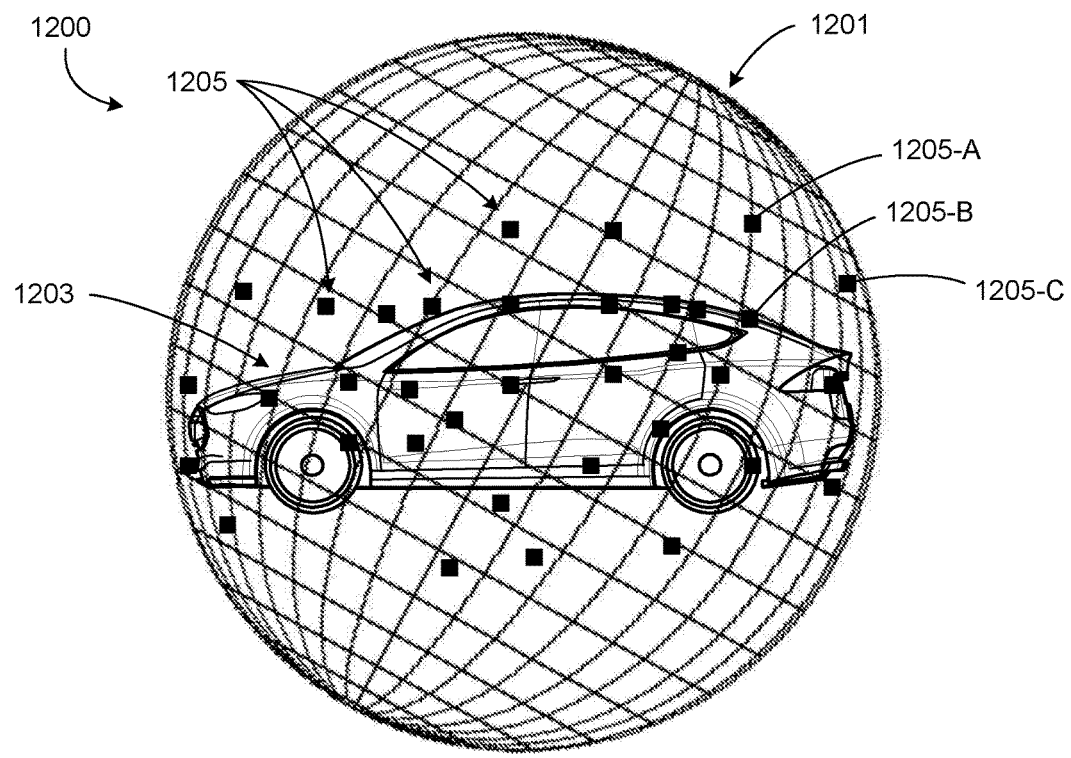
FIG. 12A illustrates an example of a multi-direction structured image array, in accordance with one or more embodiments.
Figure 12B:
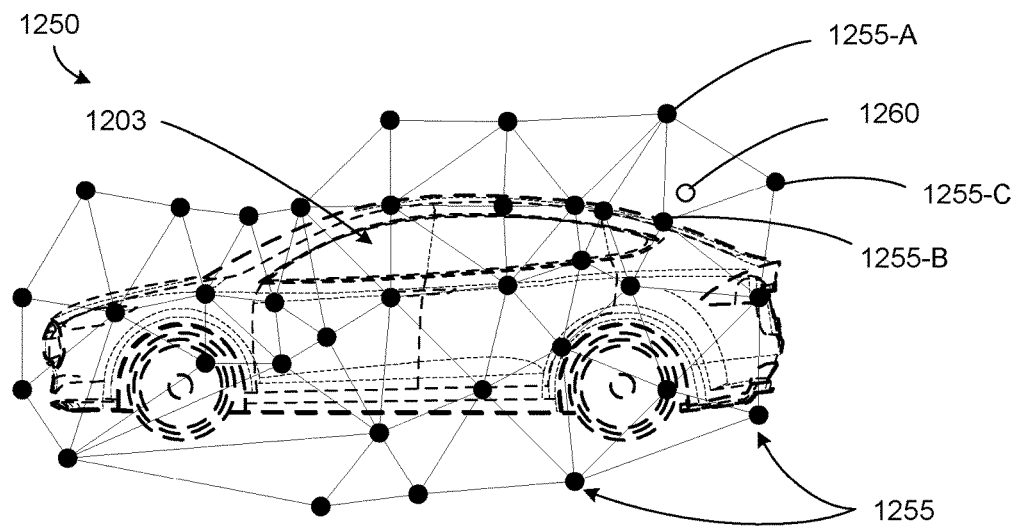
FIG. 12B illustrates an example of a 2D graph corresponding to a multi-direction structured image array, in accordance with one or more embodiments.

With reference to FIG. 11, shown is an example method for trilinear interpolation using three image frames, in accordance with one or more embodiments. At 1101, a multi-direction structured image array is generated. FIG. 12A depicts an example of a multi-direction structured image array 1200, in accordance with one or more embodiments. In some embodiments, image array 1200 may correspond to a light field comprising images captured of an object at various angles. In some embodiments, the light field may be an unstructured light field generated by moving a camera in multiple directions around an object. Each square in the light field 1200 may represent an image frame captured at a particular camera location 1205. In some embodiments, a multi-direction structured image array may be organized as a 2D graph, where each node in the 2D graph corresponds to an image frame at a particular camera location. FIG. 12B depicts an example of a 2D graph 1250 corresponding to a multi-direction structured image array, in accordance with one or more embodiments. As shown, 2D graph 1250 corresponds to image array 1200, and each node 1255 may correspond to a camera location 1205, including nodes 1255-A, 1255-B and 1255-C.

As depicted in FIGS. 12A and 12B, the object 1203 is a car. In some embodiments, a virtual bounding sphere 1201 may be placed around an object 1203, which may be visualized with a wireframe mesh, as shown in FIG. 12A. In some embodiments, the sphere 1201 serves as a bound on the scene to be captured. In some embodiments, sphere 1201 may also serve as a coverage map tracking the range of viewpoints already covered. For each input view, the sphere represents a range in two of the four dimensions of the light field. The center of sphere 1201 may be centered at a desired point corresponding to the selected center of object 1203. The size of the sphere 1201 may be adjusted to fully encompass object 1203.

Images may then be captured manually and/or automatically. A coverage map may be displayed on top of the bounding sphere 1201 overlaid on the current view of the camera. The current location of the camera may be projected onto the surface of the sphere 1201 as a small dot (not shown). Every previously recorded image of the scene is also projected onto the coverage map and occupies a square mark corresponding to the range of views that it covers under predetermined sampling criterion. As shown in FIG. 12A, each captured camera location 1205 is marked by a square brush mark, including camera locations 1205-A, 1205-B, and 1205-C. The goal is to control the movement of the camera and to "paint" the surface of the sphere 1201 with marks 1205, such that enough data to generate a high quality rendering of the object is obtained. In other embodiments, various brush marks of other shapes may be used to mark previously captured images at the various camera locations. As the camera moves around the object, a new image may be captured and/or stored when the camera is viewing an under-sampled region of the light field. Each stored image may be designated as a keyframe and may be stored with additional location data, such as IMU information. For example, a new image may be captured and stored when the camera is presented with a new perspective of the object. In some embodiments, keyframes may be automatic stored when the camera is moved to an appropriate location. In some embodiments, the camera is automatically moved to appropriate locations in the light field.

In some embodiments, a viewpoint coverage map may be used to assist a user in achieving a dense coverage. In some embodiments, the brush marks may indicate scale to assist in image capture. For example, brush marks 1205 for images captured at the same and/or similar scale as the current camera location may be displayed as green in color. Brush marks 1205 for images that correspond to camera locations closer to the object 1203 may be displayed as blue, while brush marks 1205 for images that correspond to camera locations further from the object 1203 may be displayed as red. In some embodiments, different shades or intensity of coloration may be used to indicate the degree of distance. In other embodiments, various other colorations may be used for tracking of scale. In some embodiments, optimal coverage of an object 1203 may be achieved where image frames are captured as close to the same scale as possible. In some embodiments, the camera may only capture and/or store images that are within a predetermined range of scale with respect to previously captured and/or stored keyframes.

In other aspects, a structured image array may be generated by systems and methods described in U.S. patent application Ser. No. 15/427,009 by Holzer et al., filed on Feb. 7, 2017, titled MULTI-DIRECTIONAL STRUCTURED IMAGE ARRAY CAPTURE ON A 2D GRAPH, which is incorporated by reference herein in its entirety and for all purposes. As described therein, in embodiments, one or more keyframes may be selected and stored from captured image frames. In some embodiments, the first keyframe N may be identified and stored based on the first image captured by the camera. The first image may be captured based on user selection and/or captured automatically based on predetermined criteria programmed into the camera.

Keypoints in the first keyframe may be identified. Similar to keypoint detection previously described with reference to step 903, a Harris-style keypoint detector may be implemented to detect keypoints based on salient features to designate as keypoints in each frame, such as areas of large contrast, areas with minimum ambiguity in different dimensions, and/or areas with high cornerness. However, various different keypoint detection methods, previously described above, may be implemented. In various embodiments, any number of keypoints may be identified. In some embodiments, the keypoint detection algorithm may be configured to identify a predetermined number of keypoints.

As subsequent image frames are captured, one or more keypoints may be detected in each frame, as described above. During the image capture process, identified keypoints are tracked from frame to frame. Similar to keypoint tracking previously described with reference to step 905, keypoints in subsequent frames that correspond to keypoints in the first keyframe N may be identified by a KLT feature tracker. In some embodiments, the last selected keyframe is used as the reference frame. Keypoints identified in subsequent frames are tracked from the keypoints identified in the reference frame. In some embodiments, the reference frame is replaced by the next identified keyframe.

In some embodiments, IMU data, such as rotation information, may be used to compensate for the transformations caused solely by keypoint tracking and not camera translation. For example, in a pure camera translation, tracked keypoints will move towards one direction. However, tracked keypoints may also move towards one direction of the image frame when a camera has a pure rotational movement (such as yaw or pitch), but no other translational movement. In instances where camera movement is pure rotation, a new keyframe should not be identified and stored because no new image data corresponding to the object has been captured. Thus, IMU data may be used to compute the relative warp between the current image frame and the reference frame. In other words, given IMU data corresponding to camera rotation, the transformation may be compensated by rotating the received image. Image rotation and may be performed using systems and methods described in U.S. patent application Ser. No. 15/408,211 by Holzer et al., filed on Jan. 17, 2017, titled GENERATING STEREOSCOPIC PAIRS OF IMAGES FROM A SINGLE LENS CAMERA, which is incorporated by reference herein in its entirety and for all purposes. Thus, the system may determine when movement of keypoints is due to camera rotation and when movement of keypoints is due to camera translation. In some embodiments, captured image frames in which keypoint movement is due, in significant part, to camera rotation, will not be designated and/or stored as a keyframe.

Furthermore, a convex hull of all keypoints identified on the first keyframe N is computed. Every time a new keyframe is added to the image array, the convex hull may be augmented. For example, when a new frame N+1 is tracked against the last created keyframe N, the rotational transformation is compensated for and the convex hull of the keypoints on the current frame N+1 is computed. The convex hull of the current frame N+1 may include a portion that overlaps a portion of the convex hull of the previous frames, in this case there is only the first frame N. If the size of the region of overlap is equal to, or smaller, than half of the size of the convex hull of the current frame N+1, then the current frame N+1 is designated as a keyframe and the convex hull of the first frame N is augmented with the union of the convex hull of the current frame N+1. In some embodiments, the convex hull of the current frame N+1 is combined with the convex hull corresponding to previous keyframes when the size of the region of overlap is equal to, or smaller than, some other predetermined size the convex hull of the current frame. In some embodiments, the predetermined size of the overlapping region may be larger than half the size of the convex hull of the current frame N+1. In other embodiments, the predetermined size of the overlapping region may be smaller than half the size of the convex hull of the current frame N+1.

Each subsequent convex hull of each subsequent frame is then compared to the convex hull corresponding to all previous frames to determine whether a frame is designated as a keyframe. Once a keyframe, such as keyframe N+1, is designated and stored, it may be used as a reference frame in identifying subsequent keyframes, as described above. In some embodiments, keyframes identified by this process may be represented as a node on a 2D graph, such as nodes 1255 on graph 1250. In other embodiments, such keyframes may be represented by the square brush marks in the multi-direction structured image array 1200. In some embodiments, a bounding sphere 1201 may not be used to bound the object 1203. Thus, this may ensure that every stored keyframe is includes a portion of overlap with every neighboring keyframe in the image array 1200 and/or 2D graph 1250.

At 1103, the keyframes in an array 1200 may then be projected on a 2D graph as nodes 1255, such as 2D graph 1250 shown in FIG. 12B. For example, structured image may be represented on a 2D graph 1250 where each node 1255 corresponds to a keyframe. The centers of projection for the key frames and/or captured images at each location 1205 may be triangulated to define a 2D viewpoint manifold, as shown in FIG. 12B. In some embodiments, a blending field may be constructed over the manifold by applying standard subdivision rules to the weights of each vertex to further subdivide the image array 1200 into more triangular sections. Each connection between nodes 1255 may represent a relative transformation.

At 1105, a request to view the object 1203 at a desired camera location 1260 is received. Based on user selection and/or position of the viewing device, a requested image may correspond to a camera location that is situated between nodes 1255. Various methods described herein may utilize trilinear interpolation based on the three closest keyframes to artificially render the requested image. Given a spatial location (based on user selection and/or position of the viewing device) the nearest three neighboring keyframes on the graph are located at 1107. Based on the triangulation parameters, every spatial location will fall within a triangular area formed by three nodes 1255. For example, as shown in FIG. 12B, a given spatial location 1260 falls between nodes 1255-A, 1255-B, and 1255-C. Thus, nodes 1255-A, 1255-B, and 1255-C correspond to the three keyframes that most closely neighbor the image that would exist at spatial location 1260.

Figure 12C:
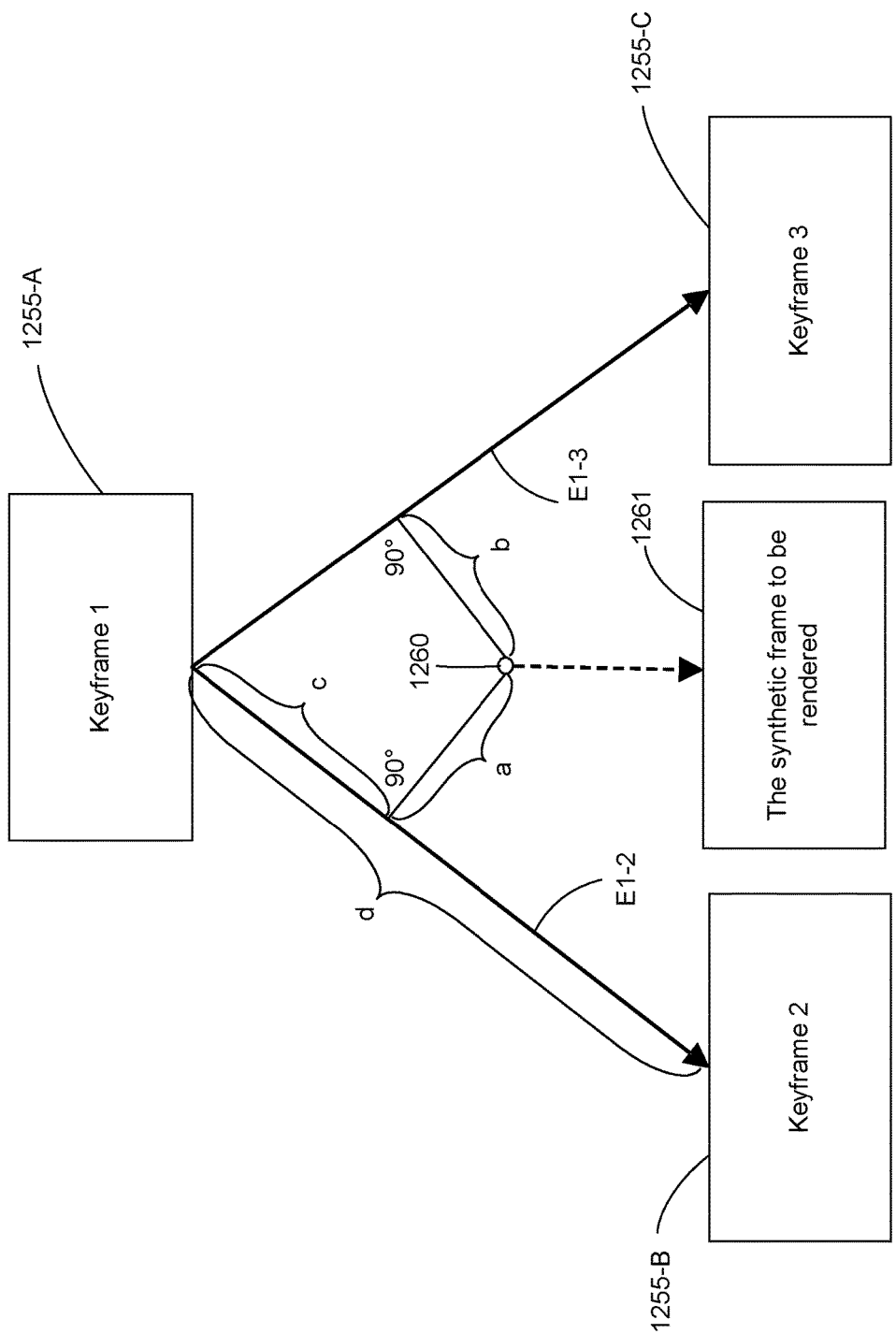
FIG. 12C illustrates an example of trilinear interpolation parameters, in accordance with one or more embodiments.

The relative transformation from spatial location 1260 to the three neighboring keyframes may be determined by trilinear interpolation. With reference to FIG. 12C, shown is an example of trilinear interpolation parameters, in accordance with one or more embodiments. For purposes of explanation, node 1255-A corresponds to keyframe 1, node 1255-B corresponds to keyframe 2, and node 1255-C corresponds to keyframe 3. Keyframes 1, 2, and 3 may be used to interpolate a synthetic frame 1261 corresponding to location 1260. An edge E1-2 connects keyframe 1 and keyframe 2, while an edge E1-3 connects keyframe 1 and keyframe 3. Each edge corresponds to the connection between the respective nodes, which may represent a relative transformation. The variable "a" represents the perpendicular distance from 1260 to E1-2, and the variable "b" represents the perpendicular distance from 1260 to E1-3.

A predetermined number of transformation candidates are determined between the three neighboring keyframes. At 1109, transformation candidates between the first neighboring keyframe and the second neighboring keyframe are solved. At 1111, transformation candidates between the first neighboring keyframe and the third neighboring keyframe are solved. With reference to FIG. 12C, transformation candidates are solved between keyframe 1 and keyframe 2, and transformation candidates are solved between keyframe 1 and keyframe 3.

In various embodiments, transformation candidates may be solved using methods described with reference to steps 901 to 917 of method 900. For example, transformation candidates may be solved between keyframe 1 and keyframe 2 by first identifying a predetermined number of keypoints in key frame 1 and their corresponding keypoints in keyframe 2, such as by using a Harris-style corner detector and a KLT feature tracker, such as in step 903. Then a RANSAC algorithm may randomly select two keypoints identified in keyframe 1 and the corresponding keypoints in keyframe 2, such as in step 905. Then, a transformation from the first frame to the second frame may be calculated based on the two keypoint correspondences by using various parameters, such as similarity 2D parameters, such as in step 907.

The calculated transformation may be applied to each identified keypoint in keyframe 1, such as in step 909, and an inlier group of transformed keypoints may be determined, such as in step 911. If a larger inlier group for the calculated transformation is determined than any previous calculated transformation, then the image intensity difference between a transformed keyframe 1 and keyframe 2, such as in step 915. The RANSAC algorithm may be programed to randomly select a predetermined number of keypoints to calculate transformation candidates. In other embodiments, the RANSAC algorithm may be programmed to randomly select keypoints until a predetermined number of transformation candidates have been calculated. Such transformation candidates may then be ranked against previously calculated transformation candidates, such as in step 917.

As previously described, eight candidate transformations resulting in the most inlier keypoints and/or lowest image intensity difference may be selected between frames. For example, transformations candidates T1-2_1, T1-2_2, T1-2_3, T1-2_4, T1-2_5, T1-2_6, T1-2_7, and T1-2_8 may correspond to eight transformation candidates between keyframe 1 and keyframe 2. Furthermore, transformation candidates T1-3_1, T1-3_2, T1-3_3, T1-3_4, T1-3_5, T1-3_6, T1-3_7, and T1-3_8 may correspond to eight transformation candidates between keyframe 1 and keyframe 3. However, the number of transformations selected as transformation candidates may be a function of processing power and any number of transformation candidates may be selected in various embodiments.

In some embodiments, the transformation candidates described above may correspond to interpolated transformation candidates which considers the position of the desired camera location 1260 with respect to the keyframes. For example, as depicted in FIG. 12C, "d" represents the distance between keyframe 1 and keyframe 2, while "c" represents the distance of the desired camera location 1260 along "d". Similar values may be determined between keyframe 1 and keyframe 3. The value c/d may represent an interpolation weight. The interpolation weight value may be applied to a transformation candidate to determine the corresponding interpolated transformation candidate. In other words, an interpolated transformation candidate may be described as the transformation corresponding to the degree and/or amount of a full transformation calculated between two keyframes, such as keyframe 1 and keyframe 2.

Once the transformation candidates have been determined, corresponding pixel values on the first and second neighboring keyframes are computed from the desired camera location based on the transformation candidates at 1113. In other words, for each pixel location, P, in the image frame corresponding to the desired location 1260, a corresponding pixel in keyframe 1 and a corresponding pixel in keyframe 2 is calculated using the eight transformation candidates solved between keyframe 1 and keyframe 2 at 1109. Similarly at 1115, for each pixel location, P, in the image frame corresponding to the desired location 1260, a corresponding pixel in keyframe 1 and a corresponding pixel in keyframe 3 is calculated using the eight transformation candidates solved between keyframe 1 and keyframe 3 at 1111. For example, transformation T1-2_1 is used to find corresponding pixel in keyframe 1 as F1-2_1, and a corresponding pixel in keyframe 2 as F2-1_1. This results in a pixel pair (F1-2_1, F2-1_1).

A set of eight pixel pairs may be determined corresponding to each transformation candidate between keyframes. The set of pixel pairs {(F1-2_1, F2-1_1), (F1-2_2,F2-1_2), (F1-2_3, F2-1_3), (F1-2_4, F2-1_4), (F1-2_5, F2-1_5), (F1-2_6, F2-1_6), (F1-2_7, F2-1_7), (F1-2_8,F2-1_8)} correspond to the pixels pairs computed based on the transformations candidates T1-2_1, T1-2_2, T1-2_3, T1-2_4, T1-2_5, T1-2_6, T1-2_7, and T1-2_8 between keyframe 1 and keyframe 2. The set of pixel pairs {(F1-3_1, F3-1_1), (F1-3_2,F3-1_2), (F1-3_3, F3-1_3), (F1-3_4, F3-1_4), (F1-3_5, F3-1_5), (F1-3_6, F3-1_6), (F1-3_7, F3-1_7), (F1-3_8, F3-1_8)} correspond to the pixels pairs computed based on the transformations candidates T1-3_1, T1-3_2, T1-3_3, T1-3_4, T1-3_5, T1-3_6, T1-3_7, and T1-3_8 between keyframe 1 and keyframe 3.

At 1117, a pair of transformations resulting in a minimum error is selected. In some embodiments, a transformation T1-2_N between keyframe 1 and keyframe 2 is selected from the eight transformation candidates between keyframes 1 and 2. Additionally, a transformation T1-3_M between keyframe 1 and keyframe 3 is selected from the eight transformation candidates between keyframes 1 and 3. The transformation pair resulting in the lowest following error is selected:

$$\mathrm{argmin}(\|F1\text{-}2\_N - F1\text{-}3\_M\| + \|F1\text{-}2\_N - F2\text{-}1\_N\| + \|F1\text{-}3\_M - F3\text{-}1\_M\|)$$

In various embodiments, finding the minimum error above may ensure that the Nth transformation between keyframes 1 and 2, and the Mth transformation between keyframes 1 and 3, comprise the best transformation combination, which results in the lowest error.

At 1119, two pixels are rendered for the desired camera location 1260 using the selected transformation pair T1-2_N and T1-3_M, as pixel R1-2 and pixel R1-3, respectively. In some embodiments, transformations T1-2_N and T1-3_M are applied to keyframe 1 to obtain pixels R1-2 and R1-3. However, transformation T1-2_N may be applied to keyframe 2 to obtain pixel R1-2, and/or transformation T1-3_M may be applied to keyframe 3 to obtain pixel R1-3. The synthetic pixels R1-2 and R1-3 are then blended at 1121 to render a final rendering pixel, PR based on the following blending algorithm:

$$PR = (R1\text{-}2*b + R1\text{-}3*a)/(b+a).$$

In some embodiments, one or more steps of method 1100 may be implemented during runtime as a user is viewing the surround view and/or selecting an image location 1260. In other embodiments, one or more steps may be performed prior to runtime. For example, transformation candidates between neighboring keyframes may be solved at step 1109 and 1111 before a user views the images at runtime.

In some embodiments, a graphics processing unit (GPU) is used to implement one or more of steps 1113 to 1115. As previously described, such GPU may be a specialized processing unit that is included in a viewing device, such as GPU 1509 described below with respect to FIG. 15. In some embodiments, each pixel in the rendered image frame is processed as a separate thread of the GPU. Thus, time complexity of the processing time for each pixel is at constant time, bounded by $O(1)$ and not $O(n)$, where n is the number of processed elements (or pixels). This causes the processing time to be the same regardless of the size of the image being interpolated because the process is bounded by a value that does not depend on the size of the input.

In some embodiments, transformation candidates may be determined between keyframe 2 and keyframe 3, as described in in steps 1109 and 1111. Furthermore, corresponding pixel values on keyframe 3 may be computed from the desired camera location based on the transformation candidates, as described in steps 1113 and 1115, to obtain a set of pixel pairs corresponding to the transformation candidates. The pixel pairs may then be used at step 1117 to select a transformation between keyframes 2 and 3 that results in a minimum error with a transformation between keyframes 1 and 2 and/or between keyframes 2 and 3. In some embodiments, this may provide a more accurate pixel interpolation. However, method 1100, as described above, provides sufficient information to interpolate pixels onto an artificial image location 1260, without the added processing time for a third transformation.

Figure 13A:
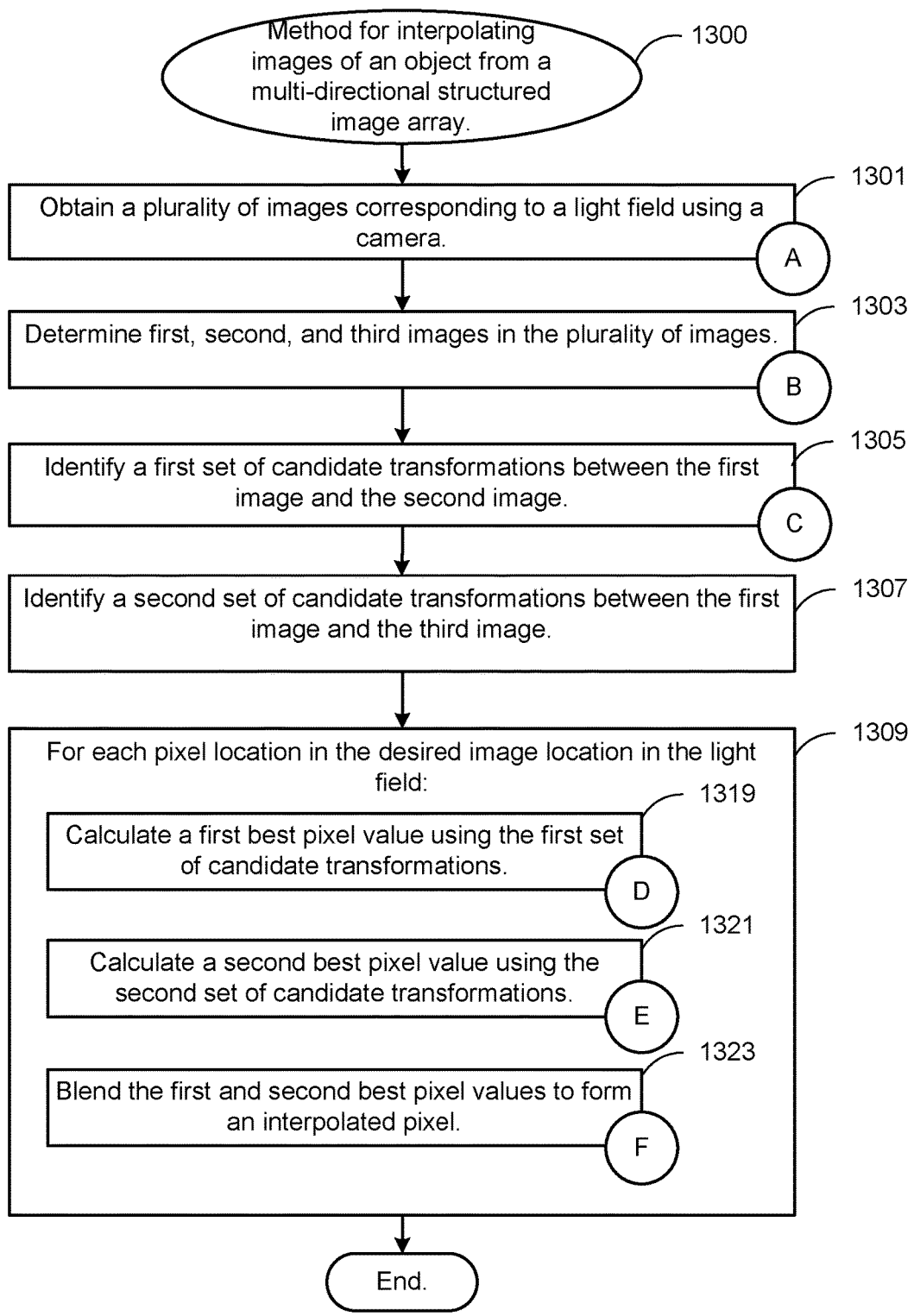
FIGS. 13A-13C illustrate an example method for interpolating images of an object from a multi-directional structured image array, in accordance with one or more embodiments.
Figure 13B:
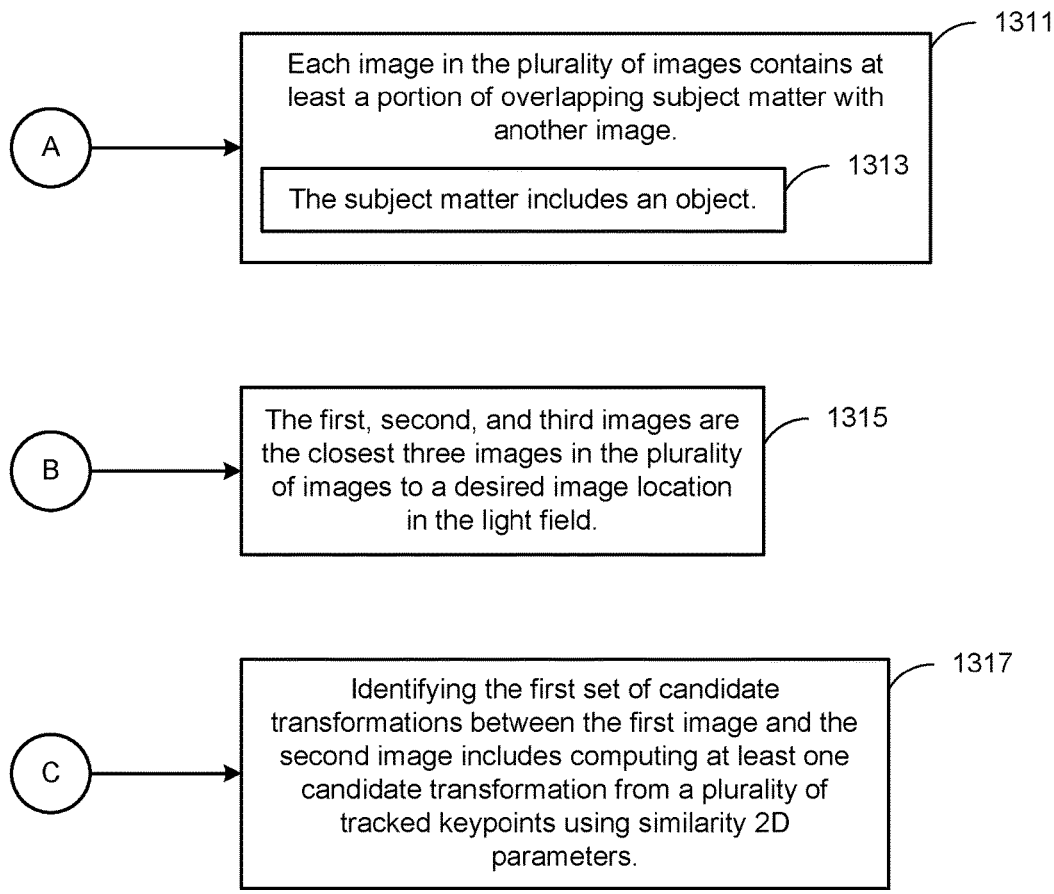
Figure 13C:
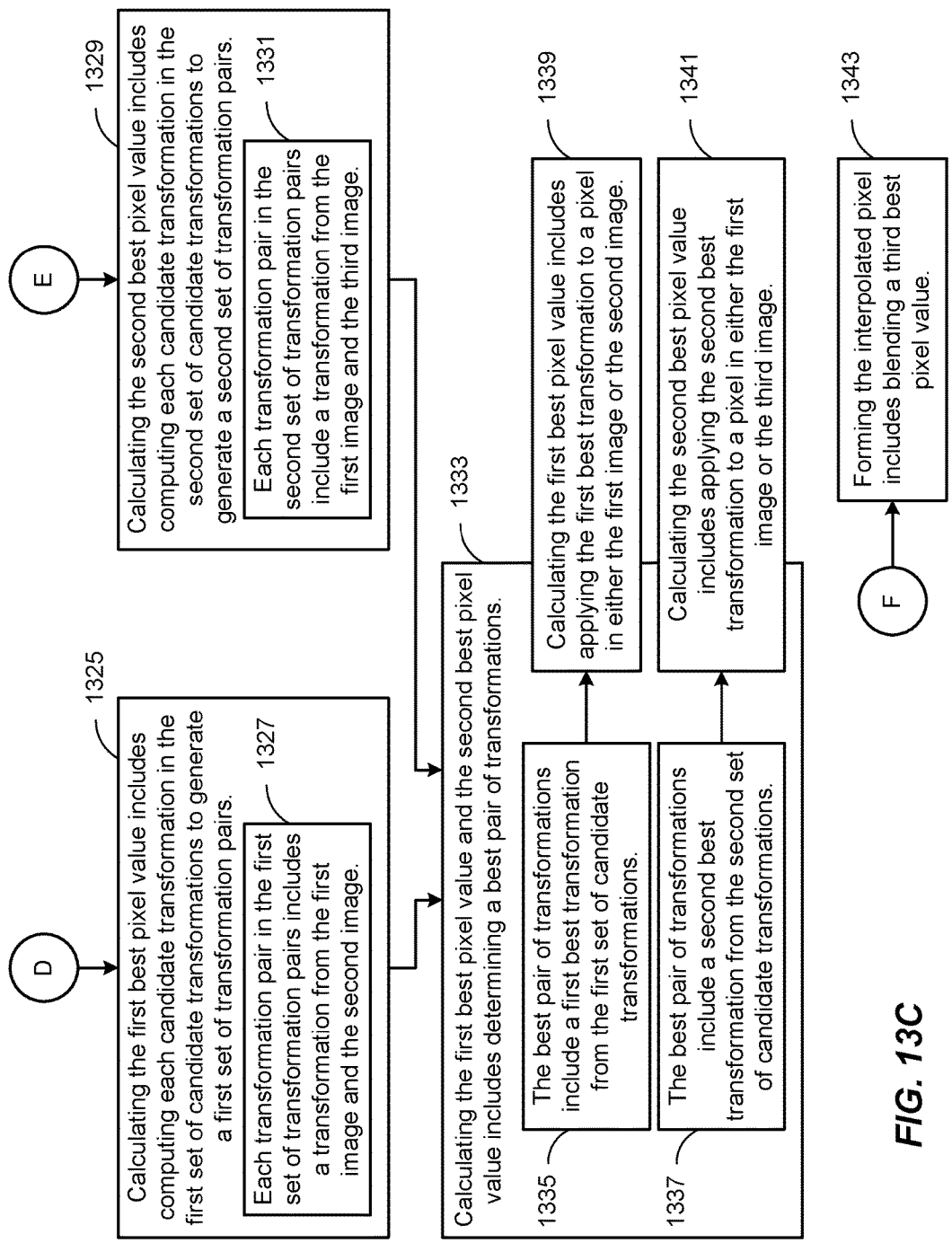

With reference to FIGS. 13A-13C, shown is an example method 1300 for interpolating images of an object from a multi-directional structured image array, in accordance with one or more embodiments. At operation 1301, a plurality of images corresponding to a light field is obtained using a camera. Each image in the plurality of images contains at least a portion of overlapping subject matter 1311 with another image. The subject matter 1311 includes an object 1313. In some embodiments, the light field may be represented as a multi-directional structured image array, such as multi-direction structured image array 1200 generated at step 1101. In some embodiments, the multi-directional structured image array may correspond to a 2D graph, such as 2D graph 1250, where each node in the 2D graph corresponds to a camera location.

At operation 1303, first, second, and third images are determined in the plurality of images, such as in step 1107. The first, second, and third images are the closest three images in the plurality of images to a desired image location 1315 in the light field. For example, the first, second, and third images may correspond to nodes in a 2D graph that are closest to a position corresponding to the desired image and/or camera location.

At operation 1305, a first set of candidate transformations is identified between the first image and the second image, such as in step 1109. For example, the first set of candidate transformations may include transformations candidates T1-2_1, T1-2_2, T1-2_3, T1-2_4, T1-2_5, T1-2_6, T1-2_7, and T1-2_8, which correspond to eight transformation candidates between keyframe 1 and keyframe 2. At operation 1307, a second set of candidate transformations is identified between the first image and the third image, such as in step 1111. For example, the first set of candidate transformations may include transformation candidates T1-3_1, T1-3_2, T1-3_3, T1-3_4, T1-3_5, T1-3_6, T1-3_7, and T1-3_8, which correspond to eight transformation candidates between keyframe 1 and keyframe 3.

As previously described, in various embodiments, transformation candidates may be solved using methods described with reference to steps 901 to 917 of method 900. In some embodiments, identifying the first set of candidate transformations between the first image and the second image includes computing at least one candidate transformation from a plurality of keypoints using similarity 2D parameters 1317. In some embodiments, identifying the second set of candidate transformations between the first image and the third image also includes computing at least one candidate transformation from a plurality of keypoints using similarity 2D parameters 1317. As previously explained, other parameters may be used to solve candidate transformations in other embodiments, including 2D translation (x and y translation), 2D Euclidean paramters (2D rotation and x,y translation), affine, homography, etc.

Method 1300 then determines best pixel values to blend to render a synthetic pixel for the interpolated image, such as in steps 1113 to 1121. For each pixel location 1309 in the desired image location 1315, a first best pixel value 1325 is calculated using the first set of candidate transformations at 1319, such as in step 1113. In some embodiments, calculating the first best pixel value 1325 includes computing each candidate transformation in the first set of candidate transformations to generate a first set of transformation pairs 1327. In some embodiments, each transformation pair in the first set of transformation pairs 1327 includes a transformation from the first image and the second image. For example, a transformation candidate T1-2_1 may be used to generate a transformation pair, which includes one transformation of a pixel from the first image to the desired camera location 1315, and another transformation of the pixel form the second image to the desired camera location 1315. In some embodiments, a transformation candidate T1-2_1 may be used generate a transformation pair, which includes one transformation for a pixel from the desired camera location 1315 to the first image, and another transformation of the pixel from the desired camera location 1315 to the second image. This may result in a pixel pair for each transformation candidate, such as pixels F1-2_1 and F2-1_1 for transformation T1-2_1.

For each pixel location 1309 in the desired image location 1315, a second best pixel value 1329 is calculated using the second set of candidate transformations at 1321, such as in step 1115. In some embodiments, calculating the second best pixel value 1329 includes computing each candidate transformation in the second set of candidate transformations to generate a second set of transformation pairs 1331. In some embodiments, each transformation pair in the second set of transformation pairs 1331 includes a transformation from the first image and the third image. For example, a transformation candidate T1-3_1 may be used to generate a transformation pair, which includes one transformation of a pixel from the first image to the desired camera location 1315, and another transformation of the pixel form the third image to the desired camera location 1315. In some embodiments, a transformation candidate T1-3_1 may be used generate a transformation pair, which includes one transformation for a pixel from the desired camera location 1315 to the first image, and another transformation of the pixel from the desired camera location 1315 to the third image. This may result in a pixel pair for each transformation candidate, such as pixels F1-3_1 and F3-1_1 for transformation T1-3_1.

In some embodiments, calculating the first best pixel value and the second best pixel value includes determining a best pair of transformations 1333, such as in steps 1117 and 1119. The best pair of transformations 1333 includes a first best transformation 1335 from the first set of candidate transformations, such as T1-2_N. The best pair of transformations 1333 also includes a second best transformation 1337 from the second set of candidate transformations, such as T1-3_M. In some embodiments, calculating the first best pixel value 1325 includes applying (1339) the first best transformation 1335 to a pixel in either the first image or the second image. In some embodiments, calculating the second best pixel value 1329 includes applying (1341) the second best transformation 1337 to a pixel in either the first image or the third image. For example, the first best pixel value 1325 may be R1-2 and the second best pixel value 1329 may be R1-3, as previously described with reference to step 1119. Pixel R1-2 may be rendered from applying the first best transformation 1335 to either the first image or the second image. Pixel R1-3 may be rendered by applying the second best transformation 1337 to the first image or the third image.

For each pixel location 1309 in the desired image location 1315, the first and second best pixel values are blended to form an interpolated pixel 1343 at 1323, such as in step 1121. For example, a final rendering pixel, PR, may be rendered based on the following blending algorithm, previously described:

$$PR=(R1\text{-}2*b+R1\text{-}3*a)/(b+a).$$

In some embodiments, forming the interpolated pixel 1343 includes blending a third best pixel value. In some embodiments, a third best pixel value for a pixel location may be calculated using a third set of candidate transformations identified between the second image and the third image, such as in operation 1305 and/or 1307. In other embodiments, the third set of transformations may be identified between the first image and a fourth image. The third best pixel value may then be calculated from the third set of candidate transformations, such as in operations 1319 and/or 1321.

Figure 14:
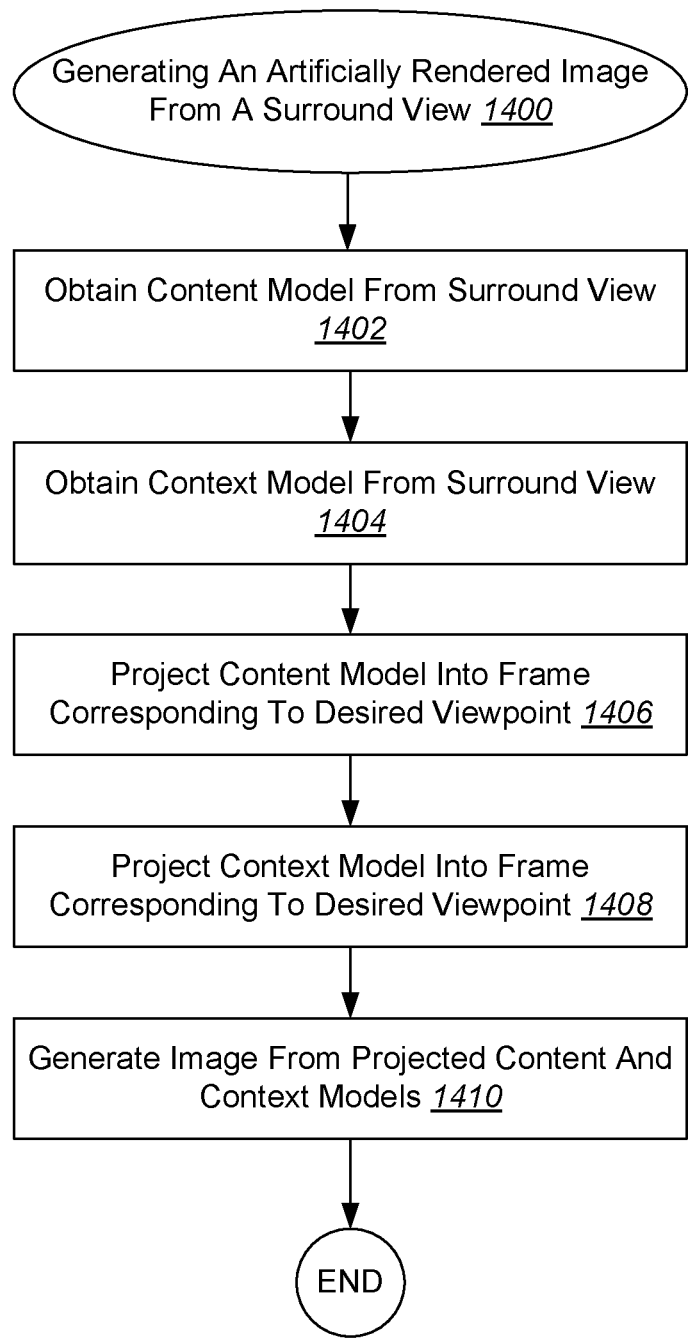
FIG. 14 illustrates an example of a process for generating an artificially rendered image from a surround view.

With reference to FIG. 14, shown is an example of a process 1400 for generating an artificially rendered image from a surround view. As described previously, a surround view is a multi-view interactive digital media representation. In some examples, the surround view is generated from multiple images having location information, and at least a portion of overlapping subject matter. Furthermore, according to various embodiments, the surround view is generated by interpolating between the multiple images and/or extrapolating data from the multiple images. In the present example, a surround view can be decomposed into one or more background panoramic representations and, in some examples, one or more foreground 3D models. An image at a specific viewpoint is then rendered by projecting the 3D model(s) and the panoramic representation(s) into a frame according to the current viewpoint and the depth and orientation of the 3D model(s).

In the present embodiment, a content model is obtained from a surround view at 1402. This content model is a foreground three-dimensional model including at least one object. In some examples, obtaining the content model from the surround view includes extracting the content model from the surround view. At 1404, a context model is obtained from the surround view. This context model is a background panoramic representation including scenery surrounding any objects in the content model. In some examples, obtaining the context model from the surround view includes extracting the context model from the surround view. Next, the content model is projected into a frame corresponding to a desired viewpoint at 1406. The context model is also projected into the frame corresponding to the desired viewpoint at 1408. According to various embodiments, the content model and context model are projected according to the depth and orientation of the content model. The artificially rendered image at the desired viewpoint is generated from a combination of the projected content and context at 1410.

Various examples of viewpoint interpolation and extrapolation are described in the present disclosure. According to various embodiments, one or a combination of methods can be used to generate a single artificially rendered image. For instance, one layer can be handled using the method described with regard to FIG. 3, another layer can be handled using the method described with regard to FIGS. 5A-5B, and a background layer can be handled using the method described with regard to FIG. 8. Any combination of methods can be used within the scope of this disclosure. Additionally, any one method can be used alone to generate an artificially rendered image.

The methods presented in this disclosure are highly efficient and can be run on a mobile platform in real-time. The various methods require only very small amounts of additional data and are therefore extremely well-suited for data that needs to be sent over a wireless network (e.g. LTE). In addition, the methods are sufficiently regularized to handle problematic cases without creating jarring artifacts. Accordingly, the methods described herein are suitable for generating artificially rendered images on mobile devices, etc.

Figure 15:
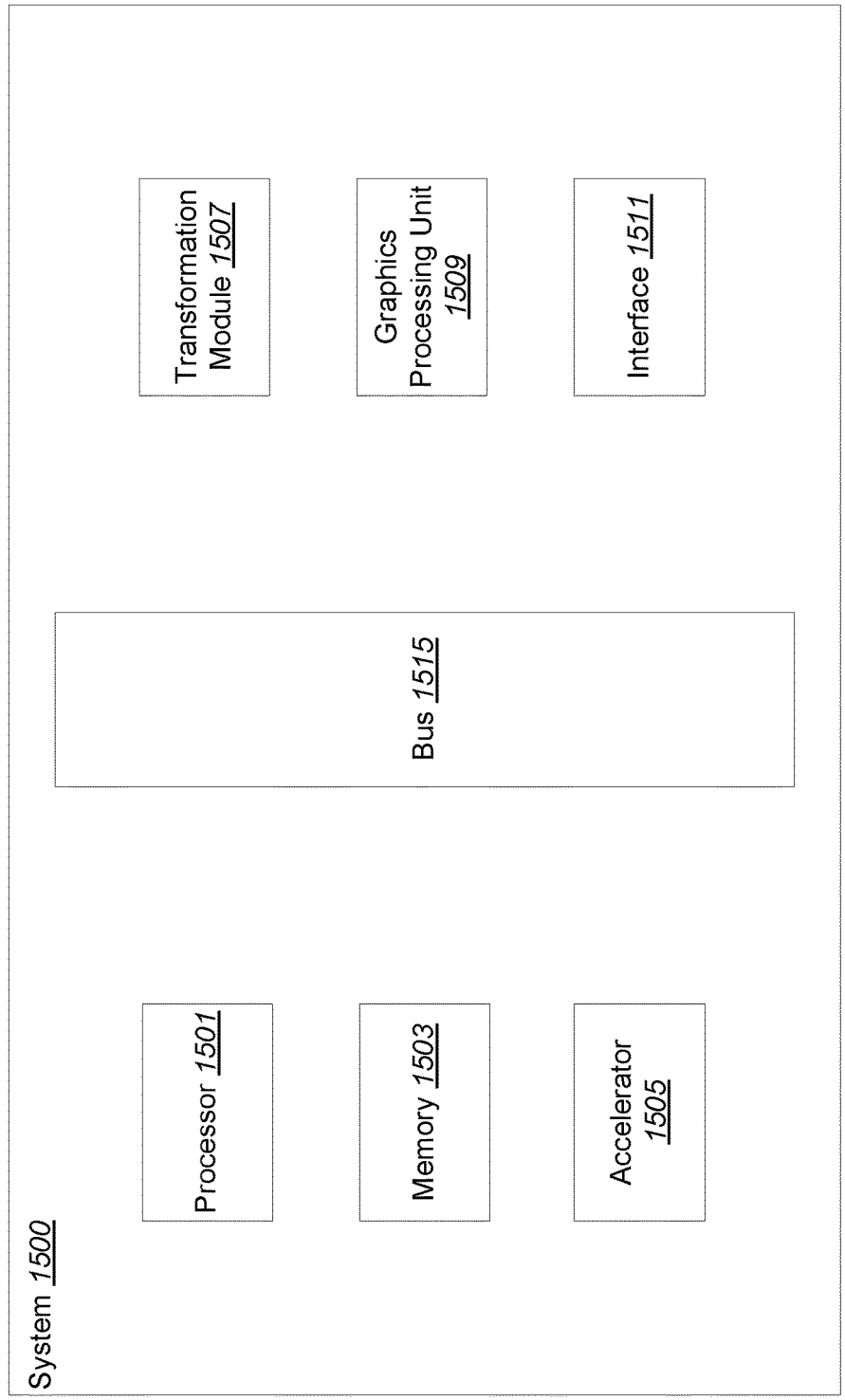
FIG. 15 illustrates a particular example of a computer system that can be used with various embodiments of the present disclosure.

Various computing devices can implement the methods described. For instance, a mobile device, computer system, etc. can be used to generate artificially rendered images. With reference to FIG. 15, shown is a particular example of a computer system that can be used to implement particular examples of the present disclosure. For instance, the computer system 1500 can be used to provide generate artificially rendered images according to various embodiments described above. In addition, the computer system 1500 shown can represent a computing system on a mobile device.

According to particular embodiments, a system 1500, suitable for implementing particular embodiments of the present disclosure, includes a processor 1501, a memory 1503, accelerator 1505, image editing module 1509, an interface 1511, and a bus 1515 (e.g., a PCI bus or other interconnection fabric) and operates as a streaming server. In some embodiments, when acting under the control of appropriate software or firmware, the processor 1501 is responsible for various processes, including processing inputs through various computational layers and algorithms, as described herein. Various specially configured devices can also be used in place of a processor 1501 or in addition to processor 1501. The interface 1511 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1500 uses memory 1503 to store data and program instructions for operations including surround view generation, keypoint selection, keypoint tracking, calculating inlier groups, measuring image intensity differences, image rendering, and various image transformation operations. The program instructions may control the operation of an operating system and/or one or more applications, for example. The memory or memories may also be configured to store received metadata and batch requested metadata.

In some embodiments, system 1500 further comprises a graphics processing unit (GPU) 1509. As described above, the GPU 1509 may be implemented to process each pixel on a separate thread to determine the optimal transformation to apply for each pixel, such as in steps 923 and 925, operation 1015, and/or steps 1113 to 1121. In some embodiments, system 1500 further comprises an accelerator 1505. In various embodiments, accelerator 1505 is a rendering accelerator chip, which may be separate from the graphics processing unit. Accelerator 1505 may be configured to speed up the processing for the overall system 1500 by processing pixels in parallel to prevent overloading of the system 1500. For example, in certain instances, ultra-high-definition images may be processed, which include many pixels, such as DCI 4K or UHD-1 resolution. In such instances, excess pixels may be more than can be processed on a standard GPU processor, such as GPU 1509. In some embodiments, accelerator 1505 may only be utilized when high system loads are anticipated or detected.

In some embodiments, accelerator 1505 may be a hardware accelerator in a separate unit from the CPU, such as processor 1501. Accelerator 1505 may enable automatic parallelization capabilities in order to utilize multiple processors simultaneously in a shared memory multiprocessor machine. The core of accelerator 1505 architecture may be a hybrid design employing fixed-function units where the operations are very well defined and programmable units where flexibility is needed. In various embodiments, accelerator 1505 may be configured to accommodate higher performance and extensions in APIs, particularly OpenGL 2 and DX9. In some embodiments, accelerator 1505 may work in conjunction with transformation module 1507 configured for solving transformations, such as in step 907, determining transformation candidates, such as in steps 909 to 917 and/or steps 1109-1111, applying transformations to individual pixels, such as in steps 923 to 925 and/or step 1119, and/or blending pixels, such as in step 1121. In some embodiments, transformation module 1507 may only be utilized when high system loads are anticipated or detected.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method for interpolating images of an object from a multi-directional structured image array, the method to be performed by a computing device, the method comprising:
   obtaining a plurality of images corresponding to a light field using a camera, wherein each image in the plurality of images contains at least a portion of overlapping subject matter with another image, the subject matter including an object;
   determining first, second, and third images in the plurality of images, the first, second, and third images being the closest three images in the plurality of images to a desired image location in the light field;
   identify a first set of candidate transformations between the first image and the second image, wherein identifying the first set of candidate transformations includes applying an interpolation weight value of c1/d1 to transformation candidates, wherein d1 represents the distance between the first image and the second image, and wherein c1 represents the distance of the desired image location along d1;
   identify a second set of candidate transformations between the first image and the third image, wherein identifying the second set of candidate transformations includes applying an interpolation weight value of c2/d2 to transformation candidates, wherein d2 represents the distance between the first image and the third image, and wherein c2 represents the distance of the desired image location along d2; and
   for each pixel location in the desired image location in the light field:
      calculate a first best pixel value using the first set of candidate transformations;
      calculate a second best pixel value using the second set of candidate transformations;
      blend the first and second best pixel values to form an interpolated pixel.

2. The method of claim 1, identifying a first set of candidate transformations between the first image and the second image includes computing at least one candidate transformation from a plurality of tracked keypoints using similarity 2D parameters.

3. The method of claim 1, wherein calculating the first best pixel value includes computing each candidate transformation in the first set of candidate transformations to generate a first set of transformation pairs, each transformation pair in the first set of transformation pairs including a transformation from the first image and the second image.

4. The method of claim 3, wherein calculating the second best pixel value includes computing each candidate transformation in the second set of candidate transformations to generate a second set of transformation pairs, each transformation pair in the second set of transformation pairs including a transformation from the first image and the third image.

5. The method of claim 4, wherein calculating the first best pixel value and the second best pixel value includes determining a best pair of transformations, the best pair of transformations including a first best transformation from the first set of candidate transformations and a second best transformation from the second set of candidate transformations.

6. The method of claim 5, wherein calculating the first best pixel value includes applying the first best transformation to a pixel in either the first image or the second image, and calculating the second best pixel value includes applying the second best transformation to a pixel in either the first image or third image.

7. The method of claim 1, wherein forming the interpolated pixel includes blending a third best pixel value.

8. A system for interpolating images of an object from a multi-directional structured image array, the system comprising:
   a camera for obtaining a plurality of images corresponding to a light field, wherein each image in the plurality of images contains at least a portion of overlapping subject matter with another image, the subject matter including an object;
   a processor, and
   memory storing one or more programs configured for execution by the processor, the one or more programs comprising instructions for:
      obtaining a plurality of images using a camera in a light field, wherein each image in the plurality of images contains at least a portion of overlapping subject matter with another image, the subject matter including an object;
      determining first, second, and third images in the plurality of images, the first, second, and third images being the closest three images in the plurality of images to a desired image location in the light field;
      identify a first set of candidate transformations between the first image and the second image, wherein identifying the first set of candidate transformations includes applying an interpolation weight value of c1/d1 to transformation candidates, wherein d1 represents the distance between the first image and the second image, and wherein c1 represents the distance of the desired image location along d1;
      identify a second set of candidate transformations between the first image and the third image, wherein identifying the second set of candidate transformations includes applying an interpolation weight value of c2/d2 to transformation candidates, wherein d2 represents the distance between the first image and the third image, and wherein c2 represents the distance of the desired image location along d2;
      for each pixel location in the desired image location in the light field:
         calculate a first best pixel value using the first set of candidate transformations;
         calculate a second best pixel value using the second set of candidate transformations;

blend the first and second best pixel values to form an interpolated pixel.

9. The system of claim 8, identify a first set of candidate transformations between the first image and the second image includes computing candidate transformations from a plurality of tracked keypoints using similarity 2D parameters.

10. The system of claim 8, wherein calculating the first best pixel value includes computing each candidate transformation in the first set of candidate transformations to generate a first set of transformation pairs, each transformation pair including a transformation from the first image and the second image.

11. The system of claim 10, wherein calculating the second best pixel value includes computing each candidate transformation in the second set of candidate transformations to generate a second set of transformation pairs, each transformation pair including a transformation from the first image and the third image.

12. The system of claim 11, wherein calculating the first best pixel value and the second best pixel value includes determining a best pair of transformations, the best pair of transformations including a first best transformation from the first set of transformations and a second best transformation from the second set of transformations.

13. The system of claim 12, wherein calculating the first best pixel value includes applying the first best transformation to a pixel in either the first image or second image and calculating the second best pixel value includes applying the second best transformation to a pixel in either the first image or third image.

14. The system of claim 8, wherein forming the interpolated pixel includes blending a third best pixel value.

15. A non-transitory computer readable medium storing one or more programs configured for execution by a computer, the one or more programs comprising instructions for:
   obtaining a plurality of images corresponding to a light field using a camera, wherein each image in the plurality of images contains at least a portion of overlapping subject matter with another image, the subject matter including an object;
   determining first, second, and third images in the plurality of images, the first, second, and third images being the closest three images in the plurality of images to a desired image location in the light field;
   identify a first set of candidate transformations between the first image and the second image, wherein identifying the first set of candidate transformations includes applying an interpolation weight value of $c1/d1$ to transformation candidates, wherein d1 represents the distance between the first image and the second image, and wherein c1 represents the distance of the desired image location along d1;
   identify a second set of candidate transformations between the first image and the third image, wherein identifying the second set of candidate transformations includes applying an interpolation weight value of $c2/d2$ to transformation candidates, wherein d2 represents the distance between the first image and the third image, and wherein c2 represents the distance of the desired image location along d2; and
   for each pixel location in the desired image location in the light field:
      calculate a first best pixel value using the first set of candidate transformations;
      calculate a second best pixel value using the second set of candidate transformations;
      blend the first and second best pixel values to form an interpolated pixel.

16. The non-transitory computer readable medium of claim 15, wherein calculating the first best pixel value includes computing each candidate transformation in the first set of candidate transformations to generate a first set of transformation pairs, each transformation pair including a transformation from the first image and the second image.

17. The non-transitory computer readable medium of claim 16, wherein calculating the second best pixel value includes computing each candidate transformation in the second set of candidate transformations to generate a second set of transformation pairs, each transformation pair including a transformation from the first image and the third image.

18. The non-transitory computer readable medium of claim 17, wherein calculating the first best pixel value and the second best pixel value includes determining a best pair of transformations, the best pair of transformations including a first best transformation from the first set of transformations and a second best transformation from the second set of transformations.

19. The non-transitory computer readable medium of claim 18, wherein calculating the first best pixel value includes applying the first best transformation to a pixel in either the first image or second image and calculating the second best pixel value includes applying the second best transformation to a pixel in either the first image or third image.

20. The non-transitory computer readable medium of claim 15, wherein forming the interpolated pixel includes blending a third best pixel value.

* * * * *